US 6,563,561 B1

(12) United States Patent
Ota et al.

(10) Patent No.: US 6,563,561 B1
(45) Date of Patent: May 13, 2003

(54) ACTIVE MATRIX TYPE LIQUID CRYSTAL SYSTEM

(75) Inventors: Masuyuki Ota, Katsuta (JP); Genshiro Kawachi, Hitachi (JP); Masaaki Kitajima, Hitachioota (JP); Tohru Sasaki, Hitachi (JP); Masahito Oh-e, Hitachi (JP); Katsumi Kondo, Katsuta (JP); Makoto Tsumura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/501,304

(22) Filed: Feb. 9, 2000

Related U.S. Application Data

(63) Continuation of application No. 09/122,781, filed on Jul. 27, 1998, now Pat. No. 6,040,886, which is a continuation of application No. 08/374,531, filed on Jan. 13, 1995, now Pat. No. 5,786,876.

(30) Foreign Application Priority Data

Mar. 17, 1994 (JP) ................................ 6-46916

(51) Int. Cl.$^7$ ............................................. G02F 1/1343
(52) U.S. Cl. ...................................... 349/141; 349/139
(58) Field of Search ............................. 349/141, 11–139, 349/143, 1, 191, 193

(56) References Cited

U.S. PATENT DOCUMENTS

| | | | | |
|---|---|---|---|---|
| 4,345,249 A | * | 8/1982 | Togashi | 349/141 |
| 4,687,298 A | * | 8/1987 | Aoki et al. | 257/350 |
| 5,233,449 A | * | 8/1993 | Shioji et al. | 349/108 |
| 5,598,285 A | * | 1/1997 | Kondo et al. | 349/141 |
| 5,617,230 A | * | 4/1997 | Ohgawara et al. | 349/108 |
| 5,841,499 A | * | 11/1998 | Baur et al. | 349/141 |
| 5,956,111 A | * | 9/1999 | Ohta et al. | 349/141 |
| 5,995,182 A | * | 11/1999 | Watanabe et al. | 349/110 |
| 6,043,858 A | * | 3/2000 | Koike et al. | 349/110 |
| 6,108,066 A | * | 8/2000 | Yanagawa et al. | 349/141 |

* cited by examiner

Primary Examiner—Toan Ton
(74) Attorney, Agent, or Firm—Antonelli, Terry, Stout & Kraus, LLP

(57) ABSTRACT

A liquid crystal display device and system having a liquid crystal composition being interposed between a first and second substrates, a plurality of pixel parts being constructed with a plurality of scanning electrodes and a plurality of signal electrodes arranged in a matrix on one of said first and second substrates, a switching element being provided in each of the pixel parts, wherein the switching element is connected to a pixel electrode, the pixel electrode and a common electrode being so constructed on the one of said first and second substrates as to be operable in keeping the major axes of the liquid crystal molecules parallel to the surface of the substrates. In the pixel part, the signal electrode and the pixel electrode is formed and a shield electrode is formed between the signal electrode and the pixel electrode.

4 Claims, 18 Drawing Sheets

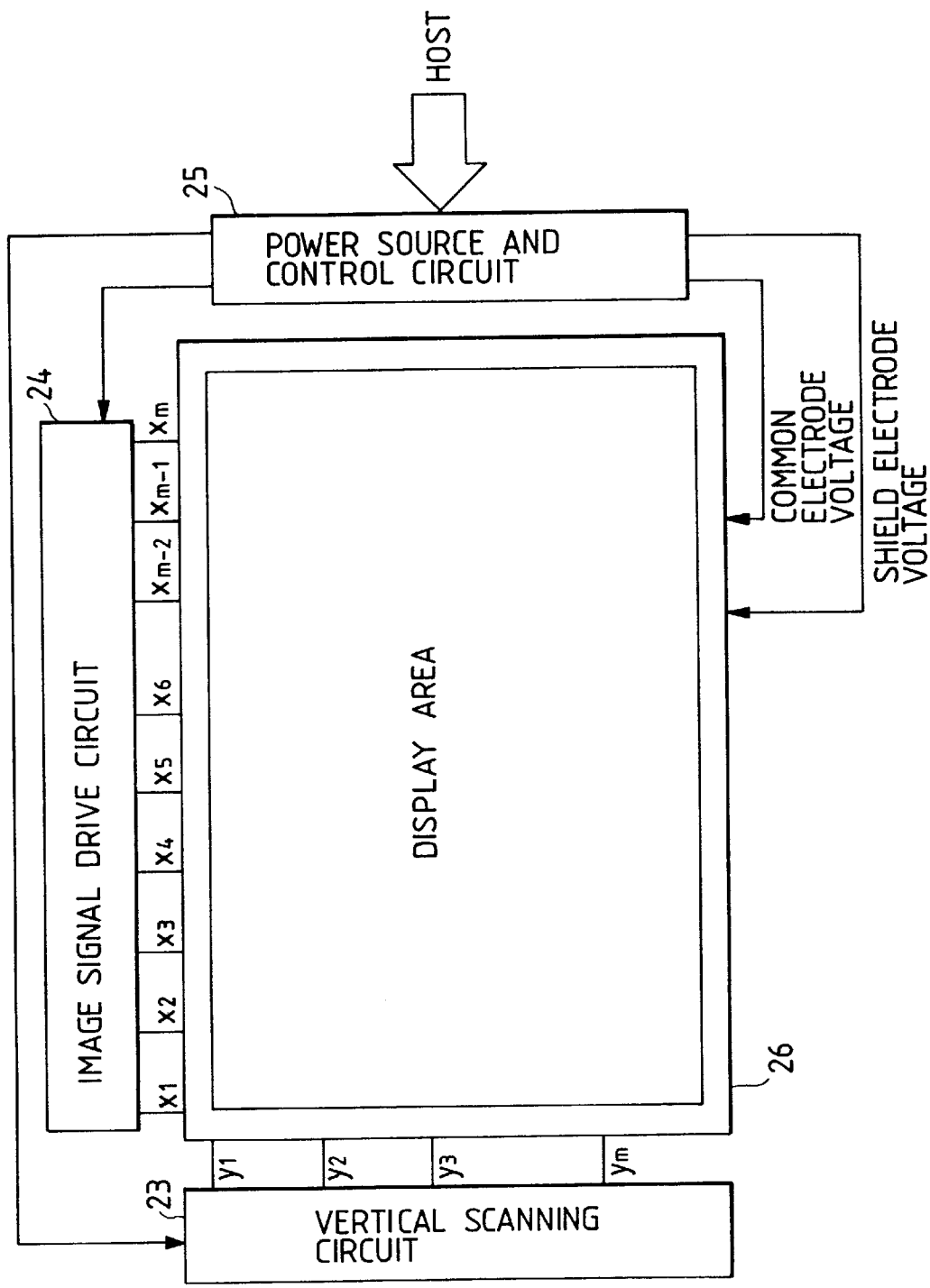

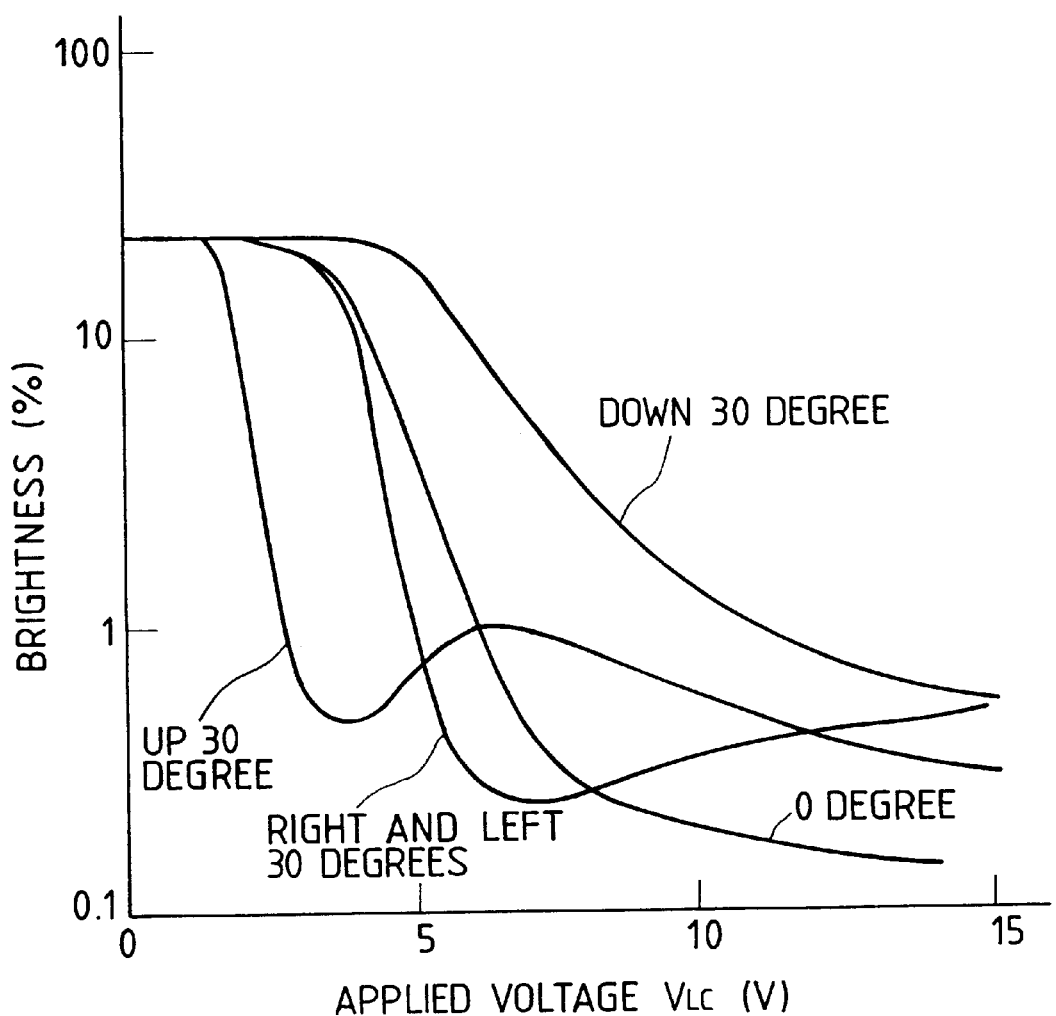

LIGHT

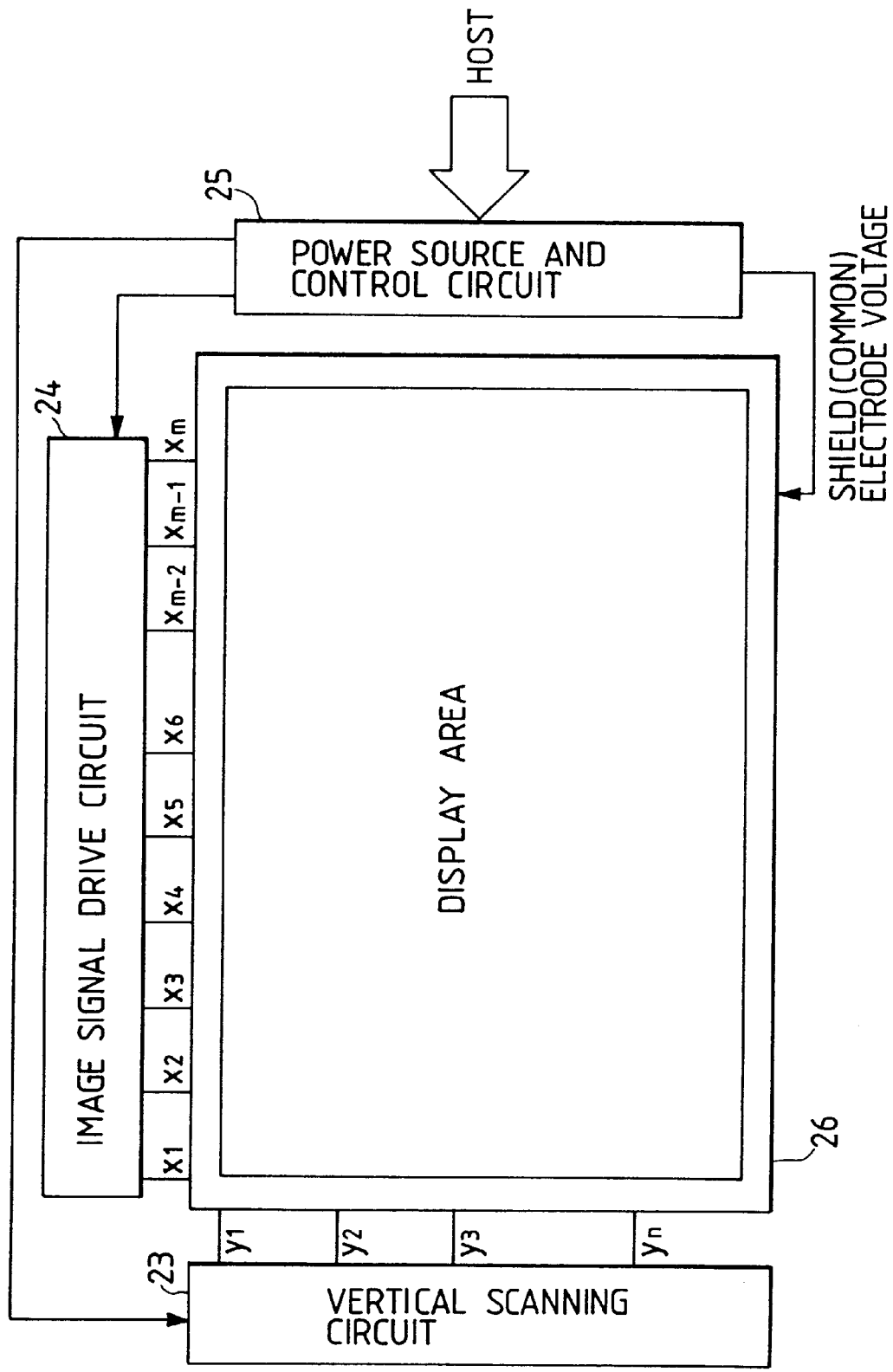

ACTIVE MATRIX TYPE LIQUID CRYSTAL SYSTEM

CROSS REFERENCE TO RELATED APPLICATION

This is a continuation of U.S. application Ser. No. 09/122,781, filed Jul. 27, 1998, now U.S. Pat. No. 6,040,886, which is a continuation of U.S. application Ser. No. 08/374,531, filed Jan. 13, 1995, now U.S. Pat. No. 5,786,876, issued Jul. 28, 1998, the subject matter of which is incorporated by reference herein.

BACKGROUND OF THE INVENTION

1. Field of the Invention

The present invention relates to an active matrix type liquid display system such as a display unit used in a personal computer.

2. Description of the Related Art

The conventional active matrix type crystal display system has used transparent electrodes formed on the interfaces between the liquid crystal and two substrates facing to each other as electrodes driving a liquid crystal layer. The cause is that the conventional active matrix type crystal display system has employed a twisted nematic display type in which.liquid crystal is driven by directing the electric field applied to the liquid crystal in the direction approximately perpendicular to the interfaces.

On the other hand, an active matrix type liquid crystal display system has been proposed in Japanese Patent Application Laid-Open No. 56-91277 (1981) in which liquid crystal is driven by directing the electric field applied to the liquid crystal in the direction approximately parallel to the interfaces.

In the conventional technology employing the twisted nematic display type described above, it is required to form a transparent electrode such as indium tin oxide (ITO) typical. However, since the transparent electrode has an unevenness of approximately several ten nm on its surface, it becomes difficult to fabricate a fine active element such as thin film transistor (hereinafter referred to as "TFT"). Further, since the projected part of the transparent electrode is often apt to be detached and mixed into other parts such as electrode, the yield of the products has been largely decreased.

Furthermore, there have been a lot of problems on the aspect of image quality in the conventional technology. Especially, it has been difficult to obtain a halftone display since change in brightness is large when the view direction is changed.

Still further, in the active matrix type liquid crystal display system using switching transistor elements, it is required to provide a.scanning electrode and a signal electrode for driving the switching transistor elements in addition to a pixel electrode for applying voltage or electric field to liquid crystal to modulate transmitted light or reflected light. The scanning electrode and the signal electrode fluctuate the voltage in the pixel electrode through the parasitic capacitance $C_{gs}$ between the scanning electrode and the pixel electrode and the parasitic capacitance $C_{ds}$ between the signal electrode and the pixel electrode. In particular, since the voltage in the signal electrode is always fluctuated by image information, the voltage in the pixel electrode is fluctuated through the parasitic capacitance $C_{ds}$ between the signal electrode and the pixel electrode to decrease the contrast or to produce a bad image called as cross-talk.

In the type in which the electric field applied to the liquid crystal in the direction approximately parallel to the interfaces of the substrates, there has been problem that the parasitic capacitance $C_{ds}$ between the signal electrode and the pixel electrode becomes large comparing to the case of the twisted nematic display type, the cross-talk being large, the contrast being decreased depending on the image pattern. The cause is that since a common electrode in the type applying the electric field to the liquid crystal in the direction approximately parallel to the interfaces of the substrates is not formed over the whole surface of the substrate facing against the substrate having switching transistor elements different from in the case of the twisted nematic display type, the line of electric force from the signal electrode is not shielded and is terminated at the pixel electrode. Therefore, in the type applying the electric field to the liquid crystal in the direction approximately parallel to the interfaces of the substrates, the active matrix driving has a disadvantage in image quality.

SUMMARY OF THE INVENTION

The first object of the present invention is to provide an active matrix liquid crystal display system which requires no transparent electrode.

The second object of the present invention is to provide an active matrix liquid crystal display system which is good in view angle characteristic and easy in multi-halftone display.

The third object of the present invention is to provide an active matrix liquid crystal display system which is high in contrast and high in quality of image without cross-talk.

The structure of the active matrix liquid crystal display system according to the present invention to attain the above objects is as follows:

(1) A liquid crystal composition is interposed between a first and a second substrates, a plurality of pixel parts being constructed with a plurality of scanning electrodes and a plurality of signal electrodes arranged in a matrix, switching element being provided in each of the pixel parts. The switching element is connected to the pixel electrode, and the pixel electrode and the common electrode facing against the pixel electrode are so constructed as to be operable in keeping the major axes of the liquid crystal molecules parallel to the surface of the substrate.

In the pixel part, the signal electrode and the pixel electrode are formed, and a shield electrode is formed between the signal electrode and the pixel electrode.

(2) According to another feature of the present invention, the shield electrode is formed in a light transmitting part except the light transmitting part between the pixel electrode and the common electrode.

(3) According to a further feature of the present invention, a light shield film being black or having a low light transmittance containing a pigment or dye is formed in the light transmitting part except the light transmitting part between the pixel electrode and the common electrode.

(4) According to a still further feature of the present switching element is connected to the pixel in the pixel part, the signal electrode is invention, the electrode, and formed, and the shield electrode is formed between the signal electrode and the pixel electrode.

The shield electrode and the pixel electrode are formed and are so constructed as to be major axes of the liquid crystal in facing to each other, operable in keeping the molecules parallel to the surface of the substrate.

(5) According to a further feature of the present invention, a part of the shield electrode is so formed as to overlap with the signal electrode.

(6) According to a further feature of the present invention, a light shield film being black or having a low light transmittance containing a pigment or dye is formed in the light transmitting part except the light transmitting part between the pixel electrode and the shield electrode.

(7) According to a still further feature of the present invention, the shield electrode is formed on the first substrate.

(8) According to a still further feature of the present invention, the shield electrode is formed on the same layer as the signal electrode is formed.

(9) According to a still further feature of the present invention, the shield electrode is formed on the same layer as the scanning electrode is formed.

(10) According to a still further feature of the present invention, the switching element is a thin film transistor having a positive stagger structure.

(11) According to a still further feature of the present invention, the shield electrode is projected from a scanning wire toward the longitudinal direction of a signal wire.

BRIEF DESCRIPTION OF THE DRAWINGS

FIG. 2 is a schematic view showing the structure of a drive system in the embodiments 1, 2, 3 and 7 in accordance with the present invention.

FIG. 5 is a graph showing the relationship between change in brightness characteristic and signal voltage due to voltage change in the signal electrode of a liquid crystal display system in accordance with the present invention.

FIG. 10 is a schematic diagram showing the drive system in Embodiments 4 to 6, and Embodiments 8 to 9.

DETAILED DESCRIPTION OF THE PREFERRED EMBODIMENTS

In order to help understanding the present invention, the operation of the present invention will be described below before describing embodiments, referring to FIG. 20.

Figure 20A:
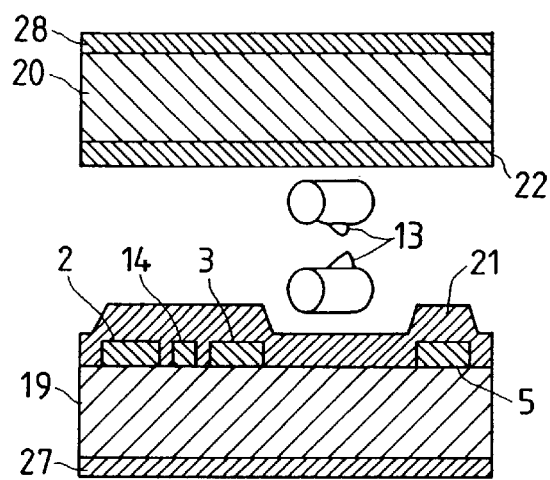
FIGS. 20(a)–20(d) are views showing an outline of the operation of the present invention.
Figure 20B:
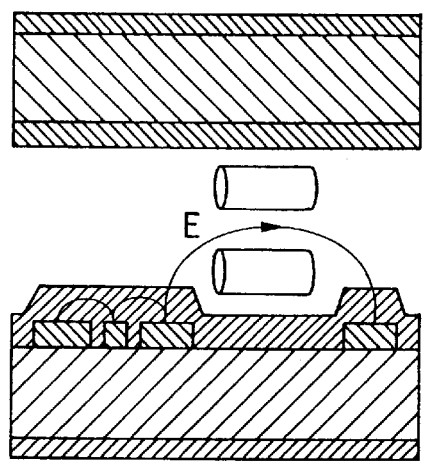
Figure 20C:
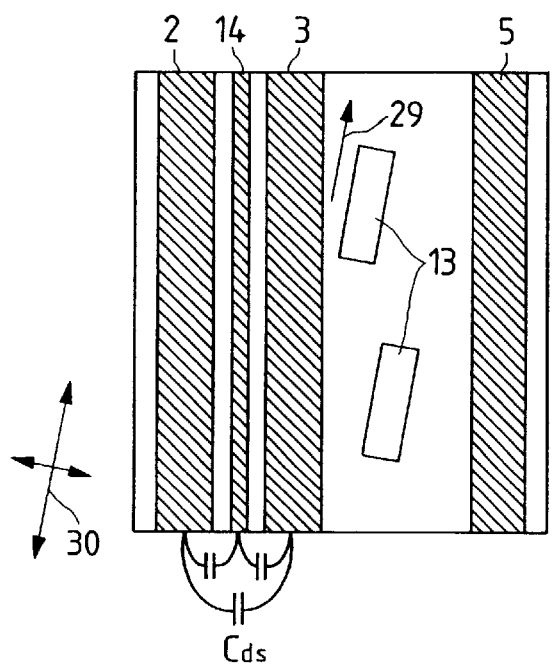
Figure 20D:
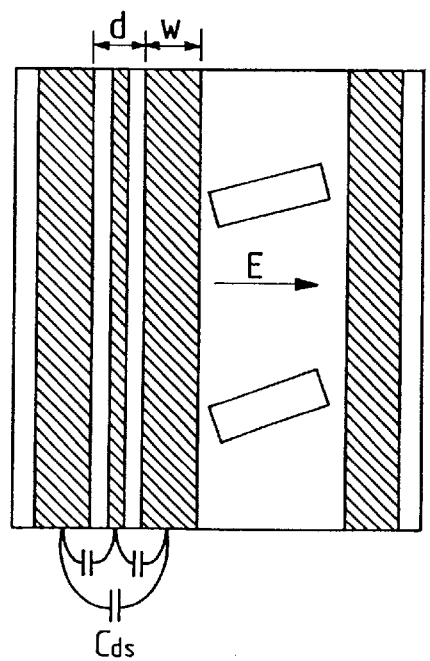

Each of FIG. 20(a) and (b) is a cross-sectional view showing a single unit of pixel in the liquid crystal cell according to the present invention, each of FIG. 20(c) and (d) being a plan view of the single unit of the pixel. In FIG. 20, an active element is omitted. Further, although scanning electrodes and signal electrodes are formed in a matrix shape to construct a plurality of pixels in the present invention, a part of a single unit of pixel is shown here.

FIG. 20(a) is a cross-sectional side view of the cell without applying voltage, and FIG. 20(c) is a plan view in that time. A stripe-shaped pixel electrode 3, a stripe-shaped common electrode 5, a stripe-shaped signal electrode 2 and a stripe-shaped shield electrode 14 are formed inside a pair of transparent substrates 19 and 20, orientational ordering films 21 and 22 (orientational ordering direction 29) being formed thereon, a liquid crystal composition material being interposed between them.

When no electric field is applied to the pixel electrode and the common electrode, the rod-shaped liquid crystal molecules 13 are aligned in such a direction as to have a certain angle to the longitudinal direction of the stripe the angle between shaped electrodes, that is, 45 degrees$\leq$| the direction of the electric field and the direction of the major axis of the liquid crystal molecules (optical axis) in the vicinity of the interface |$\leq$90 degrees. Explanation will be made here on a case where the directions of the orientational ordering of the liquid crystal molecules at the upper and lower interfaces are parallel to each other. The dielectric anisotropy of the liquid crystal composition material is assumed to be positive.

When an electric field E is applied to the pixel electrode 3 and the common electrode 5, the liquid crystal molecules change their orientation to the direction of the electric field E as shown in FIG. 20(b) and (d). By means of placing the polarization transmitting axis 30 of polarization plates 27 and 28 so as to form a given angle to the direction of the electric field, the percentage of transmitting light can be varied corresponding to the electric field applied.

According to the present invention, as described above, a display having contrasts can be realized without transparent electrode. For practical structures to produce the contrasts, there are the following two modes: a mode utilizing the state of the orientational ordering of the liquid crystal molecules on the upper and the lower substrates being nearly parallel to each other (hereinafter referred to as "double refraction mode", since this mode utilizes the interference light due to double refraction phase difference), and a mode utilizing the state of the direction of orientational order of the liquid crystal molecules on the upper and lower substrates being crossed each other and of the alignment of the molecules inside the cell being twisted (hereinafter referred to as "optical rotation mode", since this mode utilizes the optical rotation of polarization surface being rotated inside the liquid crystal composition layer).

In the double refracting mode, with applying voltage the orientation of the major axes of the molecules (optical axes) is changed on the plane keeping parallel to the surface of the substrates, the percentage of transmission light is changed due to change in the angle between the major axes of the molecules and the axes (absorbing axes or transmitting axes) of the polarized plates 27 and 28 set in a given angle.

Although, in the optical rotation mode, with applying voltage the orientation of the major axes of the molecules is also changed, this mode utilizes the change in optical rotation due to untwisting the spirals.

In the display mode where the direction of the electrical field applying to the liquid crystal is nearly parallel to the interface of the substrates, the major axes of the liquid crystal molecules are always nearly parallel to the surfaces of substrates and not perpendicular to the surface. Therefore, the change in brightness is small when view angle is changed so-called, view angle (independence of view angle), that is characteristic is excellent.

This display mode obtains the dark state not through making the double refraction phase difference of zero by applying voltage like a conventional mode, but obtains the dark state through changing the angle between the major axes of the liquid crystal molecules and the axes (absorbing axes or transmitting axes) of a polarization plates. The operation of this mode is basically different from the conventional one. In a case such as the conventional TN type where the major axes of the liquid crystal molecules are raised perpendicular to the interface of the substrates, the view direction making the double refraction phase difference of zero is the right front, that is, the direction perpendicular to the interface of the substrate. And the double refraction appears when the view angle inclines even a little. Therefore, in a normally open type, light leaks to cause decrease in the contrast and reversal in the halftone level.

Another important operation of the liquid crystal display system according to the present invention will be described below. When the pixel electrode 3 is constructed in adjacent to the signal electrode 2, the line of electric force from the signal electrode 2 terminates at the pixel electrode 3, the parasitic capacitance $C_{ds}$ between the signal electrode 2 and the pixel electrode 3, expressed as the following equation, is generated.

$$C_{ds}=(2\in/\Pi)ln\{1+(W/d)\}, \qquad [1]$$

where W is the width (length in the short side direction) of the pixel electrode, d being the distance between the signal electrode 2 and the pixel electrode 3, $\in$ being the dielectric constant of the medium between the electrodes, $\Pi$ being the circular constant, and the parasitic capacitance $C_{ds}$ indicates the capacitance per unit length.

Here, it is assumed that the dielectric constant above of the medium between the electrodes is a constant value, the width of the signal electrode 2 being equal to or wider than the width of the pixel electrode 3.

In the liquid crystal display system according to the present invention, since a shield electrode 14 is provided between the signal electrode 2 and the pixel electrode 3, most of the lines of electric force terminates at the shield electrode 14. When voltage is applied to the shield electrode 14 so as to keep the voltage in the shield electrode 14 externally, the parasitic capacitance $C_{ds}$ between the signal electrode 2 and the pixel electrode 3 drastically decreases. Therewith, since the voltage in the pixel electrode 3 does not change even when the voltage in the signal electrode changes, the cross-talk does not appear. Thus, the display mode can be applied to the active matrix system, and consequently it is possible to obtain a liquid crystal display system having an excellent view angle characteristic, a high contrast and a high image quality.

Further, since the shield electrode 14 may also serve as a light shielding layer (black matrix), there is no need to form any extra shielding layer and any transparent electrode, which improves its production yield.

Furthermore, since the shield electrode may also serve as a common electrode and consequently the shield electrode can utilize the area to be occupied by the common electrode to improve its opening ratio, which makes it possible to attain high brightness or low power consumption.

The present invention will be described below, referring to embodiments. In the display panel surface of the liquid crystal display system in the embodiments below, it will be defined that the vertical direction is the direction parallel to the longitudinal direction of the signal electrodes (perpendicular to the longitudinal direction of the scanning electrodes), the horizontal direction being the direction perpendicular to the longitudinal direction of the signal electrodes (parallel to the longitudinal direction of the scanning electrodes), the direction of rows of the matrix electrodes being parallel to the vertical direction, the direction of columns being parallel to the horizontal direction. Further, it is assumed that the number of pixels is 640(×3)× 480, the pitch between the pixels being 110 μm in the row direction and 330 μm in the column direction.

Embodiment 1

Figure 1A:
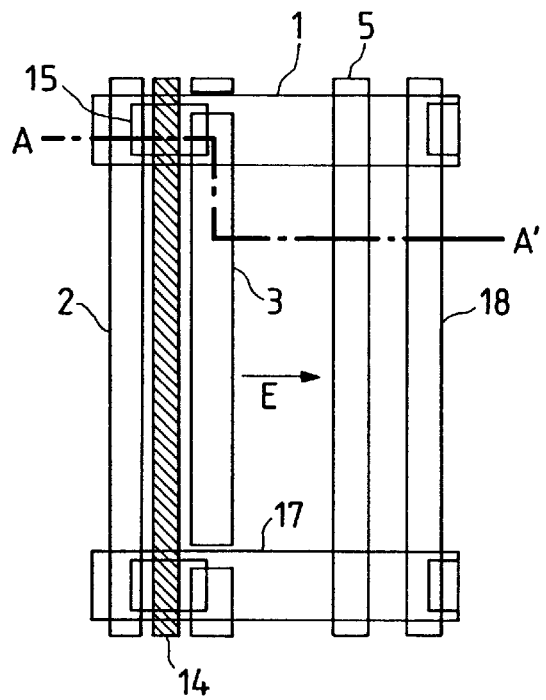
FIGS. 1(a) and 1(b) are views showing the structure of a pixel part in the embodiment 1 in accordance with the present invention.
Figure 1B:
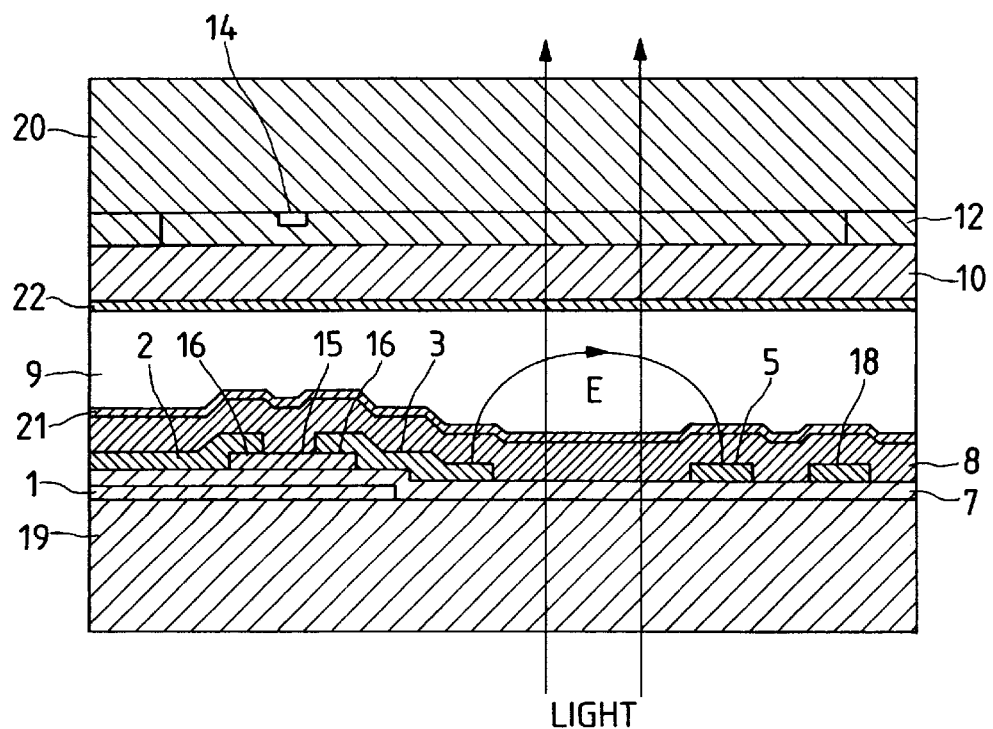

FIG. 1(*a*) is a schematic view of a pixel part of a liquid crystal display system according to the present invention, and FIG. 1(*b*) is a schematic cross-sectional view, taken along the plane of line A–A' of FIG. 1(*a*). FIG. 2 shows the structure of a drive system of the liquid crystal display system in the embodiment according the present invention. Therein, glass substrates having thickness of 1.1 mm polished their surfaces are used as substrates 19 and 20.

Scanning electrodes 1, 17 made of chromium are formed on the substrate 19 in the horizontal direction. Signal electrodes 2, 18 made of chromium/aluminum are formed in intersecting at right angle to the scanning electrodes 1, 17. Further, the pixels are formed of thin film transistor (TFT) elements using an amorphous silicon 15, a part of the scanning electrode 1 (serving as a gate electrode), a part of the signal electrode 2 (serving as a drain electrode or a source electrode) and a pixel electrode 3 (serving as a source electrode or a drain electrode). A silicon nitride film is used for a gate insulation film 7 in the TFT element.

The pixel electrode 3 is formed on the same layer, in the same process and of the same material as those of the signal electrodes 2, 18 such that its longitudinal direction comes in the vertical direction. An n+type amorphous silicon 16 is formed between the amorphous silicon 15 and the signal electrode 2 and between the amorphous silicon 15 and the pixel electrode 3 to make ohmic contact.

A common electrode 5 is formed in a stripe-shape on the same layer, in the same process and of the same material as those of the pixel electrode 3 and the signal electrodes 2, 18, and is directed toward the vertical direction to be connected to a common line as well as the common electrodes in the other rows.

The orientation of the liquid crystal molecules in the liquid crystal layer is controlled mainly by the electric field E applied in the horizontal direction between the pixel electrode 3 and the common electrode 5. Light passes through between the pixel electrode 3 and the common electrode 5, entering into the liquid crystal layer 9 to be modulated. Therefore, it is not necessary that the pixel electrode 3 is limited to have transparency (for example, transparent electrode such as ITO).

On the TFT element there is formed a silicon nitride protecting film 8 for protecting the TFT element. A shield electrode 14 is formed on a substrate 20 (hereinafter referred to as "opposite substrate") being opposite to the substrate 19 (hereinafter referred to as "TFT substrate") having the group of TFT elements. On this occasion, the shield electrode ]4 is formed so as to be placed between the signal electrode 2 and the pixel electrode 3 in a stripe-shape, and is directed toward the vertical direction to be connected to a common line as well as the shield electrodes in the other rows.

Further, on the opposite substrate 20, there is formed in the vertical direction a color filter 12 composed of three colors, R, G, B, being stripe-shaped. On the color filter 12, a flattening film 10 made of a transparent resin is laminated to flatten the surface. Epoxy resin is used as the material for the flattening film 10. Furthermore, orientation control films 21, 22 made of polyimide group resin are formed through spreading on the flattening film 13 and the protecting film 8.

A nematic liquid crystal composition 9 is interposed between the substrates 19 and 20. The nematic crystal composition has a dielectric anisotropy $\Delta\in$ of positive value of 7.3, and a double refraction $\Delta n$ of 0.073 (589 nm, 20° C.). Although the liquid crystal having a dielectric anisotropy $\Delta\in$ of positive value is used, a liquid crystal having a dielectric anisotropy $\Delta\in$ of negative value may be used.

The orientation control films 21, 22 are treated in rubbing process to make its pre-tilting angle in 1.0 degree.

The directions of rubbing on the upper and the lower interfaces are parallel to each other, and the angle between the rubbing direction and the applied electric field E is 85 degrees. The gap (d) between the upper and the lower substrates is 4.5 $\mu$m under the state of containing the liquid crystal by means of dispersing and interposing spherical polymer beads between the substrates. Therewith, the value $\Delta n \cdot d$ becomes 0.329 $\mu$m.

The panel above is sandwiched with two polarization plates (a product of Nitto Denkou Co.; type G1220DU) (polarization plates are not shown in the figure). The axis of polarization transmission in one of the polarization plate is set in the direction nearly parallel to the rubbing direction (85 degrees), the axis of polarization transmission in the other polarization plate is set in intersecting nearly at right angle with the above axis (−5 degrees). Therewith, a liquid crystal display system having normally closed characteristic is obtained.

Next, a vertical scanning circuit 23 and a image signal drive circuit 24 are connected to the TFT substrate 19 in the liquid crystal display panel 26 as shown in FIG. 2, the liquid crystal display system is driven with active matrix drive by means of supplying scanning signal voltage, image signal voltage, timing signal, common electrode voltage and shield electrode voltage from a power source and a control circuit 25.

In the embodiment, the shield electrode voltage and the common electrode voltage are independent from each other, the shield electrode voltage is supplied by being electrically connected from the TFT substrate 19 to the shield electrode on the opposite electrode using silver paste.

Although, in the embodiment, the amorphous silicon TFT elements are used, poly-silicon TFT elements may be used. In a case of reflection type display system, MOS transistors formed on a silicon wafer may be used The materials for wiring are also not limited.

Further, although the orientation control film is provided in the embodiment, the flattening film 10 may serve also as an orientation control film by means of directly rubbing the surface of the flattening film. Similarly, epoxy resin may be used for the protection film 8 for the TFT elements and may be performed with rubbing treatment.

Figure 3:
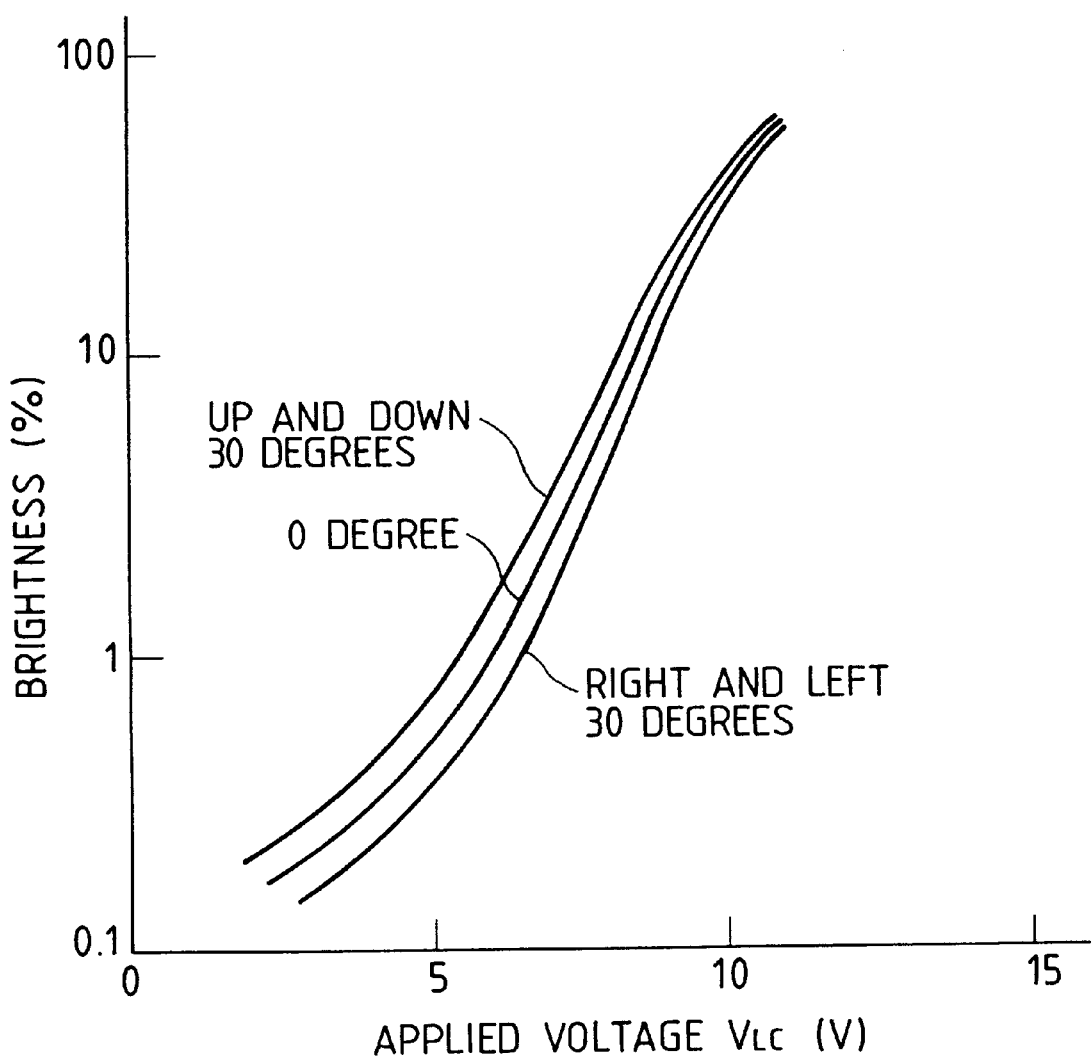
FIG. 3 is a graph showing the view angle dependence of a liquid crystal display system in accordance with the present invention.

Next, FIG. 3 shows the relationship between the applied voltage to the liquid crystal and the brightness in the embodiment. The contrast ratio becomes above 150 at 7V driving. When view angle is changed in the lateral and the perpendicular directions, the difference in the contrast ratio curve is very small comparing to the conventional method, and the display characteristic does not change when view angle is changed. On addition to these, the orientation of the liquid crystal is excellent, and no domain due to orientational failure appears.

Figure 4A:
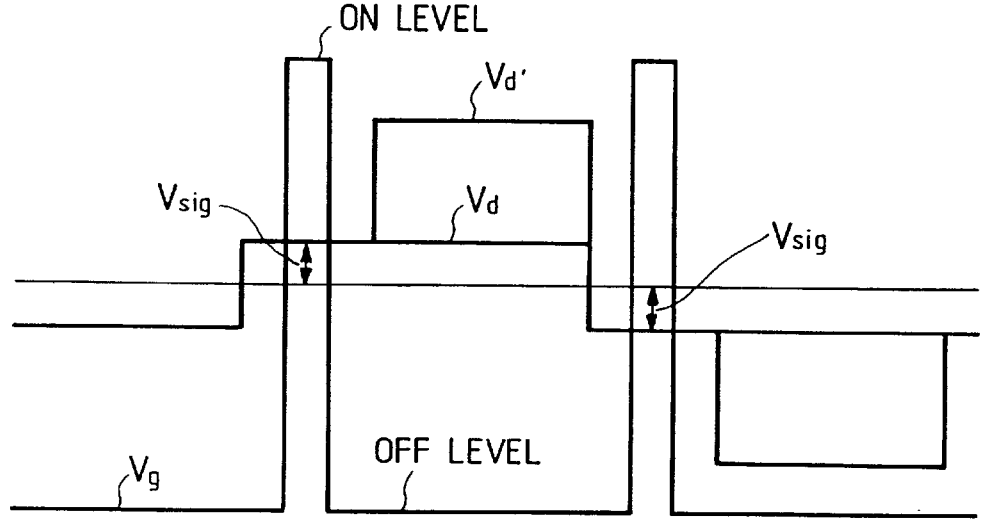
FIGS. 4(a) and 4(b) show signals and a graph showing the view angle dependence of a conventional liquid crystal display system.
Figure 4B:
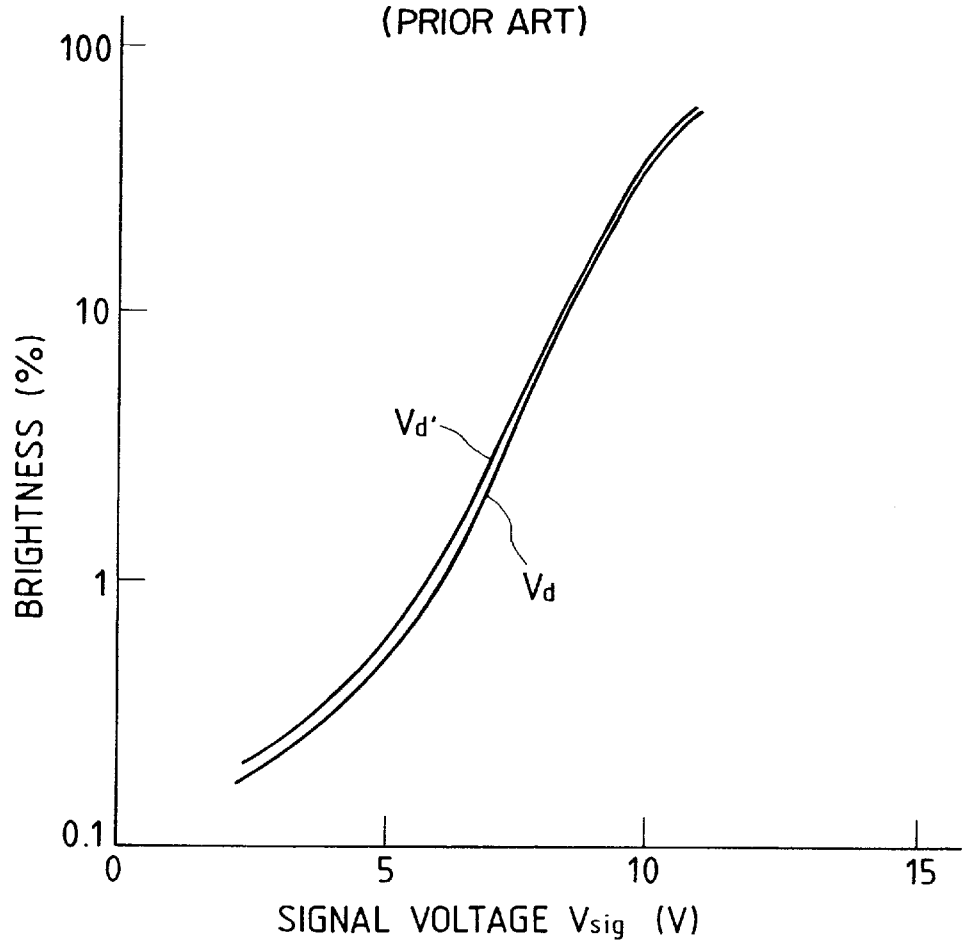

FIG. 4 shows the change in the curve of the brightness versus the signal voltage $V_{sig}$ depending on the difference in the wave form of the signal electrode voltage $V_d$ in the embodiment. FIG. 4(a) shows the voltage wave form, FIG. 4(b) showing the change in curve of the signal voltage $V_{sig}$ versus the brightness.

After the scanning electrode voltage $V_g$ is turned on and the signal voltage $V_{sig}$ is written in, the signal electrode voltage $V_d$ is changed. However, no significant change in the curve of the signal voltage $V_{sig}$ versus the brightness.

As described above, in the embodiment, the strength of transmitting light can be modulated without using transparent electrode, and the view angle characteristic can be substantially improved. It is possible to obtain a liquid crystal display system which can suppress the cross-talk in the vertical direction, that is a disadvantage in the method where the electric field is applied parallel to the interface of the substrate, and is high in through-put, high in product yield, wide in view angle, high in contrast and high in image quality.

Comparing Example 1

A conventional twisted nematic (TN) type liquid crystal display system having a transparent electrode has been fabricated to compare with the system in Embodiment 1. The gap (d) is 7.3 $\mu$m, the twisting angle being 90 degrees. Therefore, the value $\Delta n \cdot d$ becomes 0.526 $\mu$m.

FIG. 5 shows the electro-optical characteristic. The curve substantially changes depending on the view direction, and a domain due to the failure of orientation of the liquid crystal appears near the discrete portion of the TFT adjacent part.

Comparing Example 2

Figure 6A:
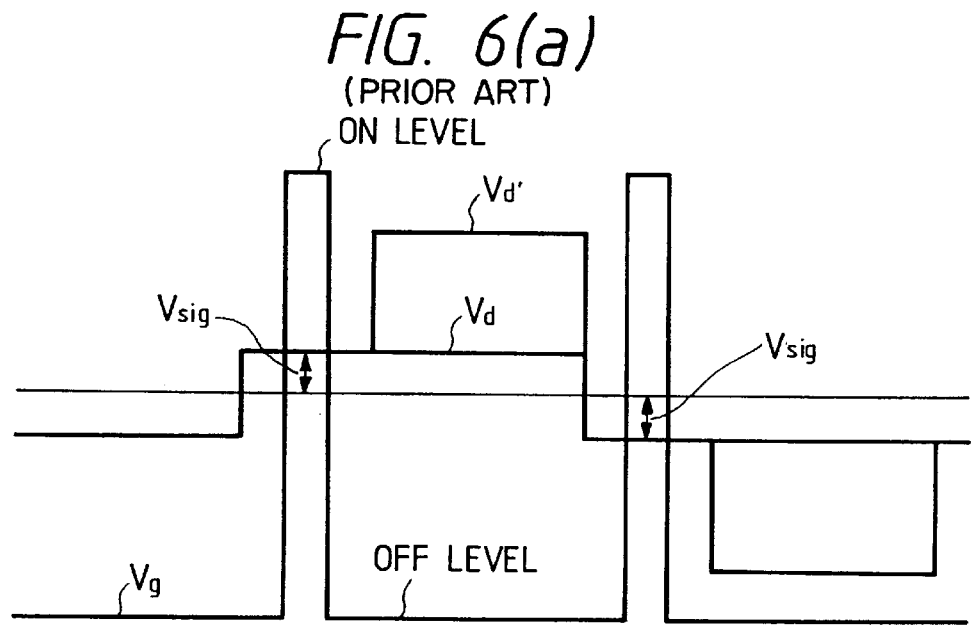
FIGS. 6(a) and 6(b) show signals and graph showing the relationship between change in brightness characteristic and signal voltage due to voltage change in the signal electrode of a conventional liquid crystal display system.
Figure 6B:
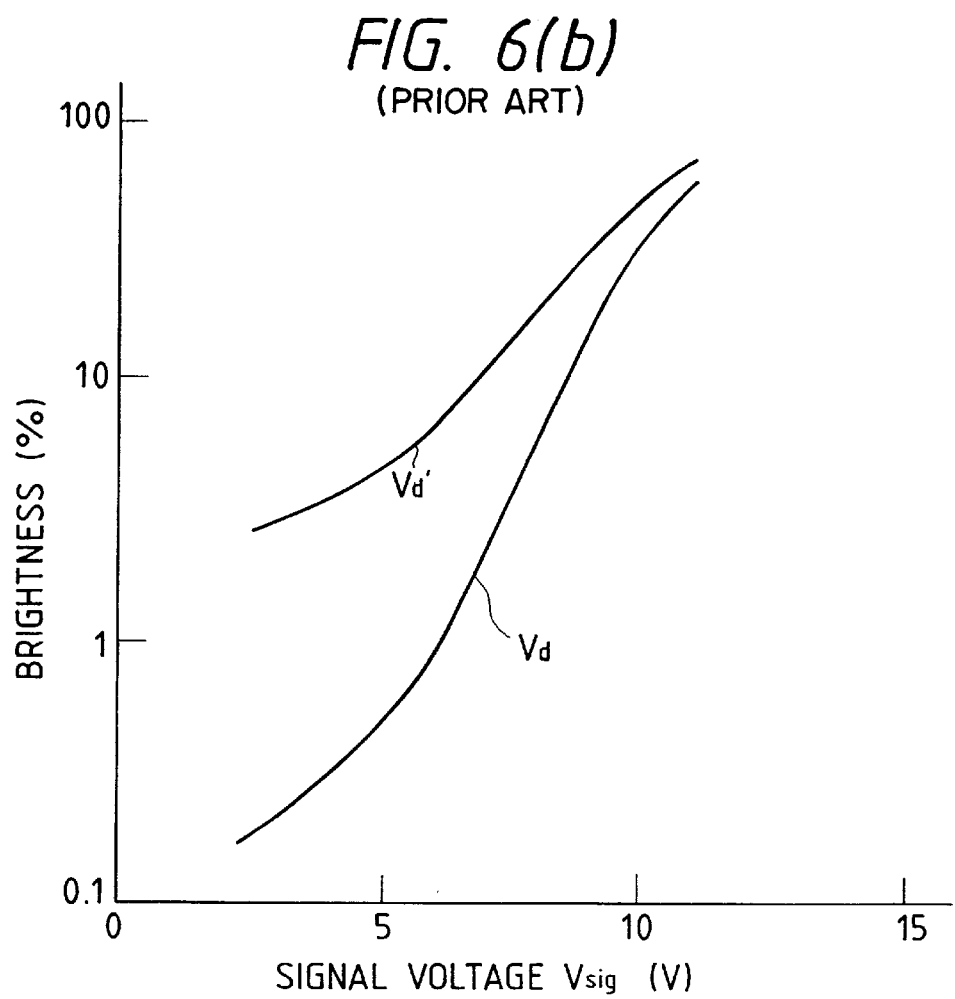

FIG. 6 shows change in the signal voltage versus the brightness characteristic corresponding to change in the signal electrode voltage in a case where the shield electrode in FIG. 1 is not formed. It can be understood that a substantial difference is caused in the curve of the signal voltage $V_{sig}$ versus the brightness depending on the difference in the wave form of the signal electrode voltage $V_d$.

Further, from the view point of image quality, the crosstalk in the vertical direction appears and the substantial decrease in contrast is caused as shown in the curve $V_d'$ in the figure.

Embodiment 2

The construction of the embodiment here is the same as Embodiment 1 except the following items.

Figure 7A:
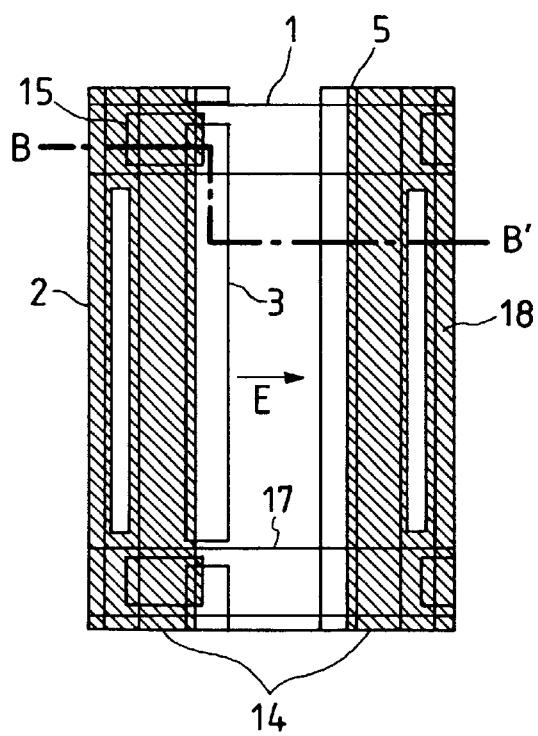
FIGS. 7(a) and 7(b) are views showing the structure of the pixel part in Embodiment 2.
Figure 7B:
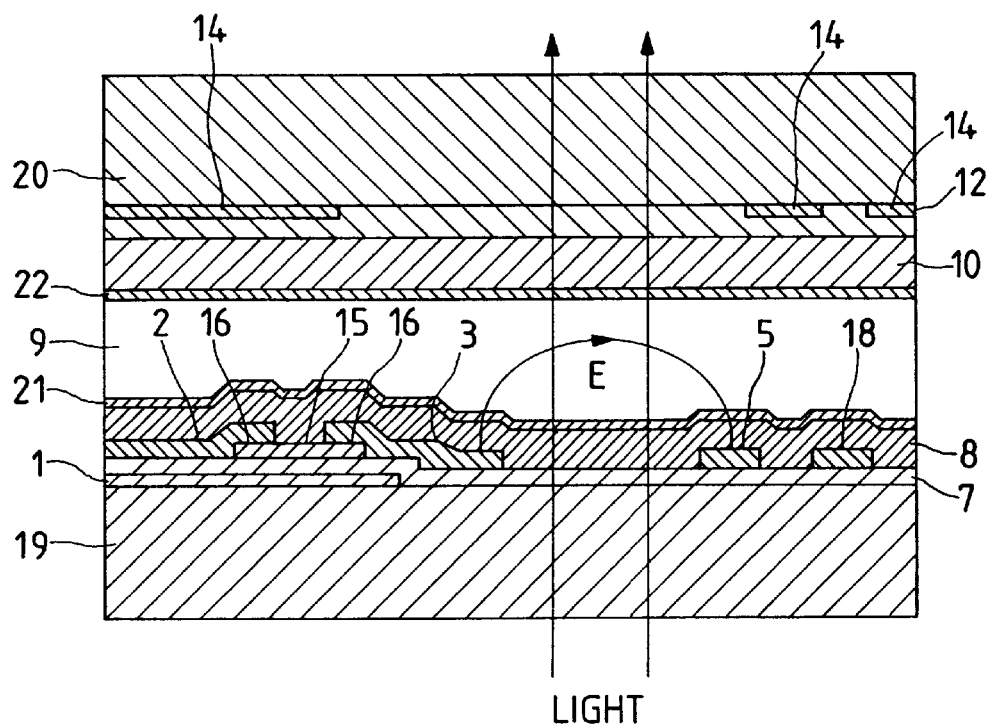

FIG. 7(a) is a schematic plan view of a pixel in a liquid crystal display panel of the embodiment, FIG. 7(b) is a schematic cross-sectional view being along the line B–B' in FIG. 7(a). The structural feature of the embodiment is in the point that a shield electrode 14a is formed to cover the whole part of light transmission part between the pixel electrode 3 and the signal electrode 2 and between the common electrode 5 and the signal electrode 18. Therewith, the light leakage is not caused without light shielding layer, and high contrast can be attained.

Further, since the surface above the amorphous silicon 15 is also covered with the light shielding layer, there is no increase in the leak current in the amorphous silicon due to light and it is realized to obtain an excellent display characteristic.

A slit-shaped opening part is provided on the signal electrodes 2 and 13 of the shield electrode 14a not to increase the capacitance between the signal electrode and the shield electrode as small as possible, and the overlap with the signal electrodes 2 and 18 is minimized so as to become only the over-lap of the margin for adjusting accuracy.

As described above, in this embodiment, the same effect as in Embodiment 1 can be obtained. Further, it is possible to obtain an active matrix type liquid crystal display system being high in contrast and high in image quality.

Embodiment 3

The construction of the embodiment here is the same as Embodiment 1 except the following items.

Figure 8A:
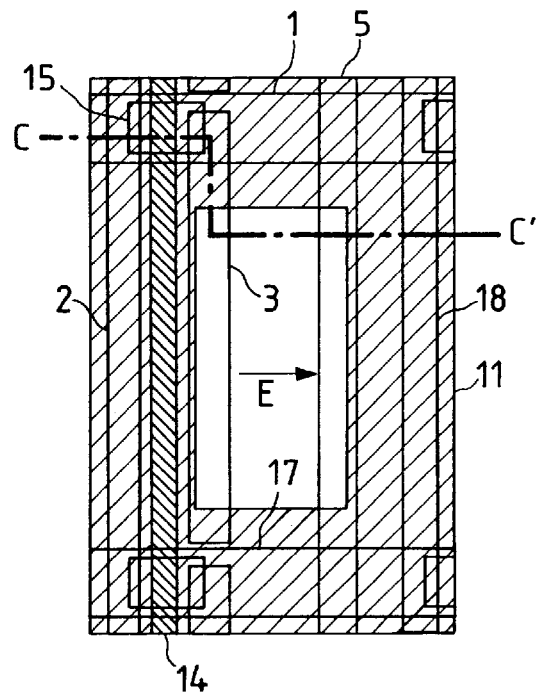
FIGS. 8(a) and 8(b) are views showing the structure of the pixel part in Embodiment 3.
Figure 8B:
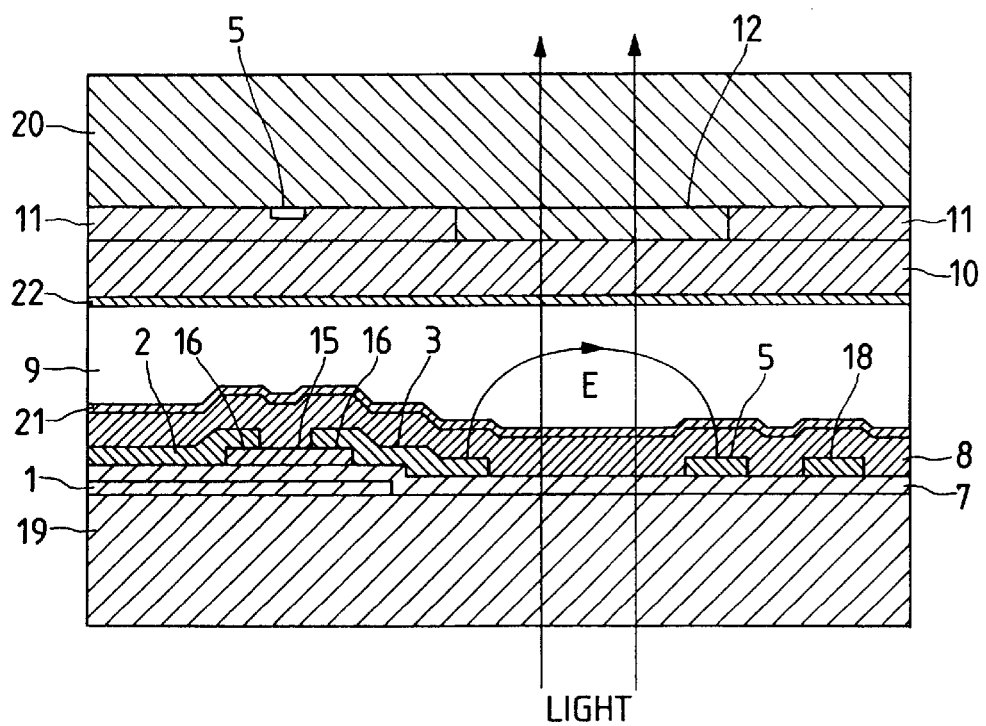

FIG. 8(a) is a schematic plan view of a pixel in a liquid crystal display panel of the embodiment, FIG. 8(b) is a schematic cross-sectional view being along the line C–C' in FIG. 8(a). The structural feature of the embodiment is in the point that a matrix-shaped light shielding film 11 made of an insulator containing black pigment (black matrix) is formed on the opposite substrate 20 in the same layer as the color filter 12a is formed. The light shielding film 11 made of insulator does not affect to the electric field applied between the pixel electrode 3 and the common electrode 5, and the orientation failure region (domain) due to the electric field between the pixel electrode 3 and the scanning electrodes 1, 17 and between the common electrode 5 and the scanning electrodes 1, 17 can be shielded. Thus the contrast can be improved.

Further since the surface above the amorphous silicon 15 is also covered with the light shielding layer similar to Embodiment 2, there is no increase in the leak current in the amorphous silicon due to light and it is realized to obtain an excellent display characteristic. Although the black pigment is used in the embodiment, dye may be also used. In addition to this, the color is not limited to black, any color can be used as far as its transmission ratio for visual light is sufficiently low.

Since there is no electrode on the signal electrodes 2, 18, it is realized that the capacitance between the signal electrode and the shield electrode is decreased comparing to Embodiment 2, the load of the image signal drive circuit 24 being decreased, the chip size of the drive LSI being made small and the consumption electric power being decreased by decreasing the load of the signal electrode.

As described above, in the embodiment, the same effect as Embodiments 1, 2 can be attained, and further it is possible to obtain an active matrix type liquid crystal display system being high in contrast and low in consumption electric power.

Embodiment 4

The construction of the embodiment here is the same as Embodiment 1 except the following items.

Figure 9A:
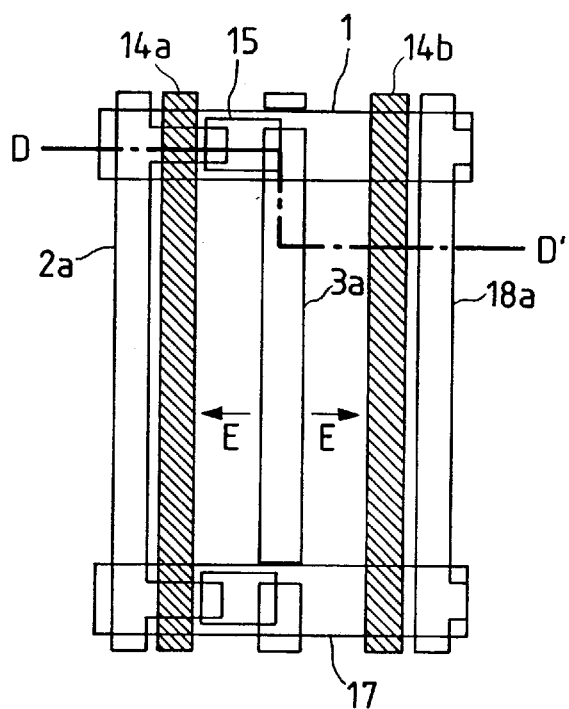
FIGS. 9(a) and 9(b) are views showing the structure of the pixel part in Embodiment 4.
Figure 9B:
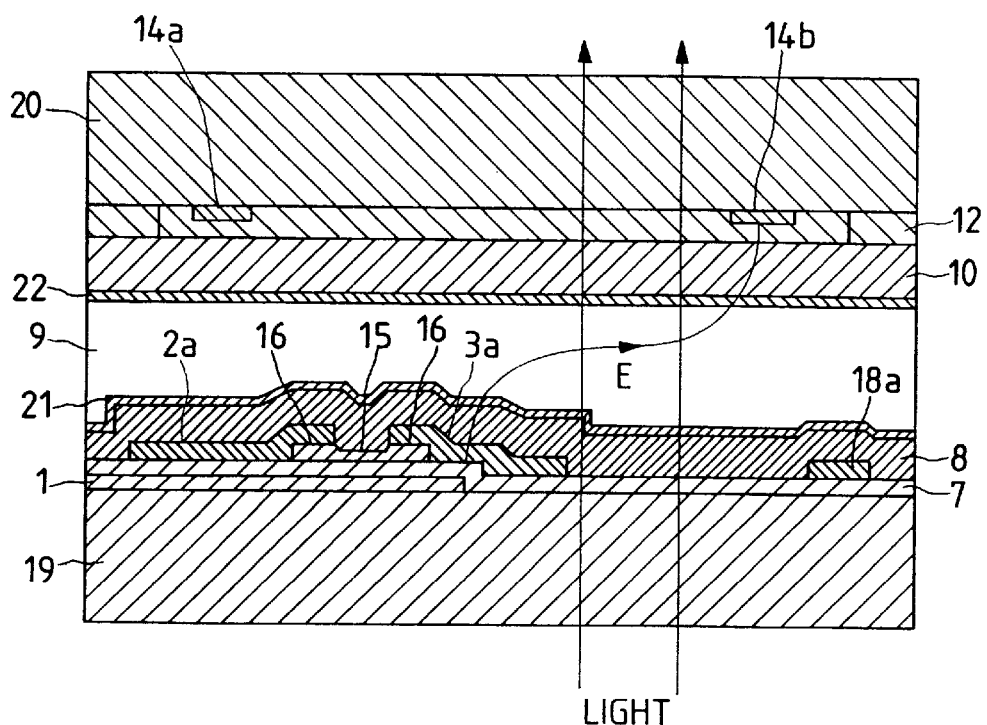

FIG. 9(a) is a schematic plan view of a pixel in a liquid crystal display panel of the embodiment, FIG. 9(b) is a schematic cross-sectional view being along the line D–D' in FIG. 9(a). In this embodiment, in the construction of a single pixel, two shield electrodes 14a and 14b are formed on the opposite substrate 20 adjacent to the signal electrodes 2a and 18a, a pixel electrode 3a being placed between the shield electrode 14a and the shield electrode 14b.

Therewith, the electric field E from the signal electrodes 2a and 18a terminates at the shield electrodes 14a and 14b, the parasitic capacitance between the signal electrode and the pixel electrode is substantially decreased. Since the pixel electrode 3a is placed at a most distant place from the signal electrodes 2a, 18a (in the middle position between the signal electrode 2a and the signal electrode 18a), the capacitance between the signal electrodes 2a, 18a and the pixel electrode 3a can be decreased more. The feature of the embodiment is in the point that the major axes of the liquid crystal molecules are operated with keeping the direction of the axes nearly parallel to the surface of the substrate to control the amount of transmitting light with the electric field between the shield electrodes 14a, 14b and the pixel electrode 3a without constructing common electrode.

FIG. 10 shows the structure of the drive system in the embodiment of a liquid crystal display system. Since the shield electrodes 14a, 14b, in the embodiment, also serve as a common electrode, no common electrode is required. Although the pixel electrode 3a is placed in the middle position between the signal electrode 2a and the signal electrode 18a and pixels are divided into two parts, it is possible to provide plural pixel electrodes additionally and to divide the pixels into four or more parts. In a type where the shield electrode also serves as a common electrode as in the embodiment, the dividing number of the pixels becomes 2n (n is a natural number).

Further, in the embodiment, the area to be occupied by the common electrode on the pixel plane can be utilized for the shield electrode, and utilizing the opening between the shield electrode and the pixel electrode improves its opening ratio, which makes it possible to obtain a liquid crystal display system being high in brightness or low in power consumption by decreasing electric power consumed by the back light.

As described above, in the embodiment, the same effect as Embodiment 1 can be attained by means of making the shield electrode serve as a common electrode, and further it is possible to obtain an active matrix type liquid crystal display system being high in contrast and low in consumption electric power.

Embodiment 5

The construction of the embodiment here is the same as Embodiment 4 except the following items.

Figure 11A:
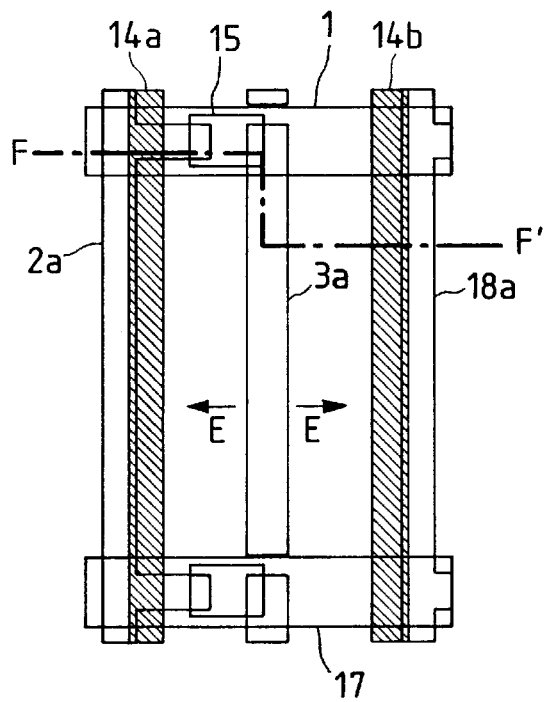
FIGS. 11(a) and 11(b) are views showing the structure of the pixel part in Embodiment 5.
Figure 11B:
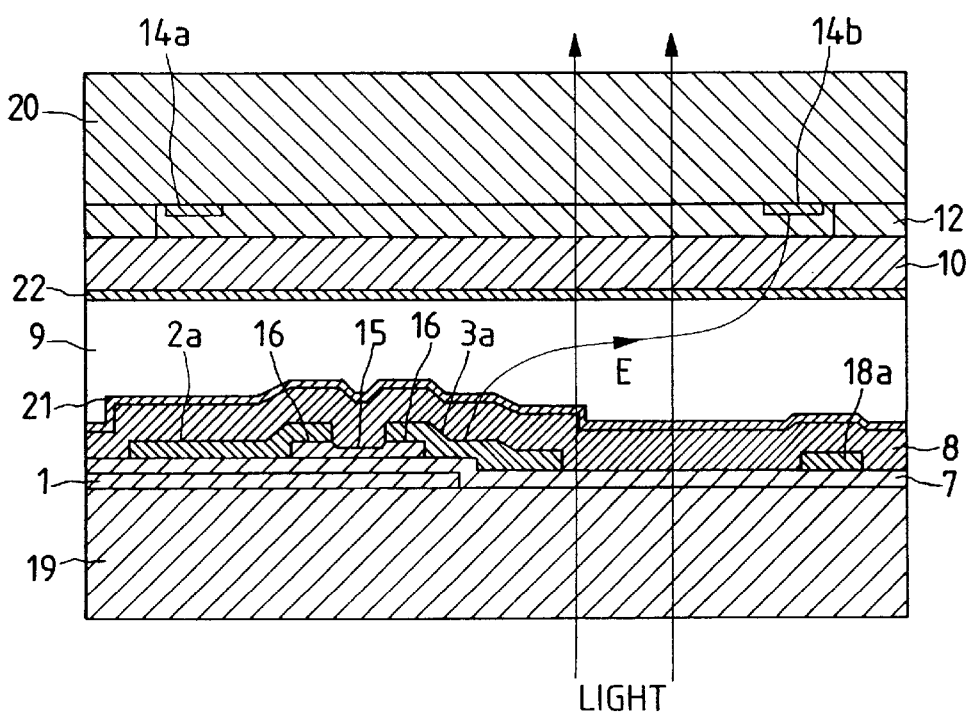

FIG. 11(a) is a schematic plan view of a pixel in a liquid crystal display panel of the embodiment, FIG. 11(b) is a schematic cross-sectional view being along the line F–F' in FIG. 11(a). The structural feature of the embodiment is in the point that the shield electrode 14a and the signal electrode 2a, and the shield electrode 14b and the signal electrode 18a are overlaid in the horizontal direction. Thereby, the light leakage is not additionally caused without light shielding layer, and high contrast can be attained. Further, since the distance between the pixel electrode 3a and the shield electrodes 14a, 14b becomes large, the area of light transmission portion (opening ratio) between the pixel electrode 3a and the shield electrodes. 14a, 14b is increased to improve the transmission ratio.

As described above, in the embodiment, the same effect as Embodiment 4 can be attained, and further it is possible to obtain an active matrix type liquid crystal display system being high in contrast and low in consumption electric power.

Embodiment 6

The construction of the embodiment here is the same as Embodiment 4 except the following items.

Figure 12A:
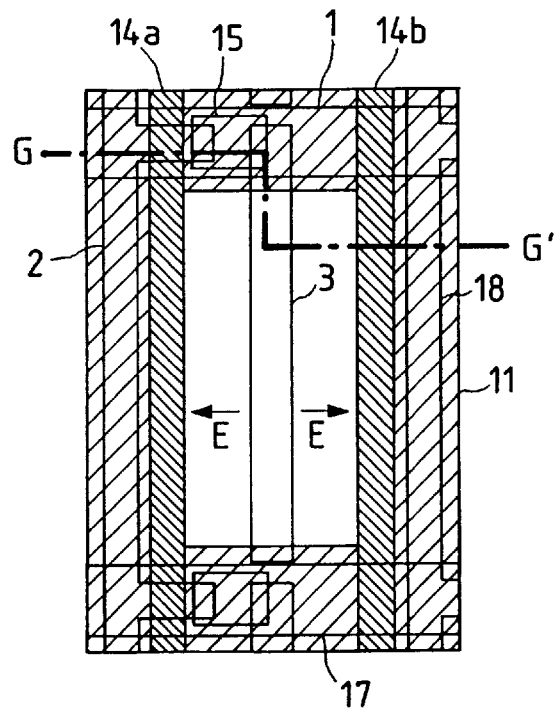
FIGS. 12(a) and 12(b) are views showing the structure of the pixel part in Embodiment 6.
Figure 12B:
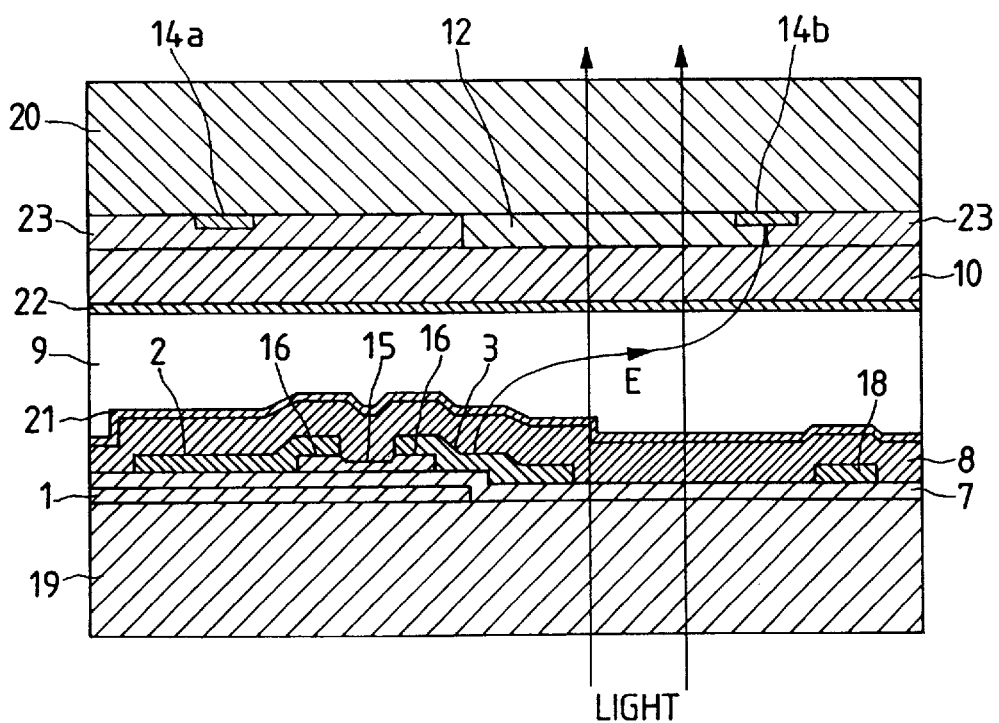

FIG. 12(a) is a schematic plan view of a pixel in a liquid crystal display panel of the embodiment, FIG. 12(b) is a schematic cross-sectional view being along the line G–G' in FIG. 12(a). The structural feature of the embodiment is in the point that a matrix-shaped light shielding film 11 made of an insulator containing black pigment (black matrix) is formed on the opposite substrate 20 in the same layer as the color filter 12a is formed. The light shielding film 11 made of insulator does not affect to the electric field applied between the pixel electrode 3 and the shield electrodes 14, 14b and the orientation failure region (domain) due to the electric field between the pixel electrode 3 and the scanning electrodes 1, 17 and between the shield electrodes 14a, 14b and the scanning electrodes 1, 17 can be shielded. Thus the contrast can be improved.

Further since the surface above the amorphous silicon 15 is also covered with the light shielding layer, there is no increase in the leak current in the amorphous silicon due to light and it is realized to obtain an excellent display characteristic. On displacement for adjusting positions of the substrates 19, 20, there is no problem in the horizontal direction. Even when the light shielding film 11 is displaced between the shield electrodes 14a and 14b, the opening ratio does not decrease.

Although the black pigment is used in the embodiment, dye may be also used. In addition to this, the color is not limited to black, any color can be used as far as its transmission ratio for visual light is sufficiently low.

As described above, in the embodiment, the same effect as Embodiment 4 can be attained, and further it is possible to obtain an active matrix type liquid crystal display system being high in contrast and low in consumption electric power.

Embodiment 7

The construction of the embodiment here is the same as Embodiment 1 except the following item.

Figure 13A:
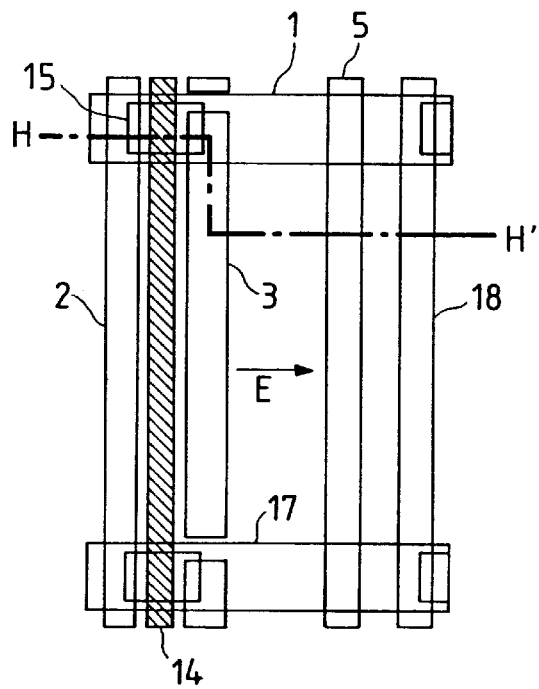
FIGS. 13(a) and 13(b) are views showing the structure of the pixel part in Embodiment 7.
Figure 13B:
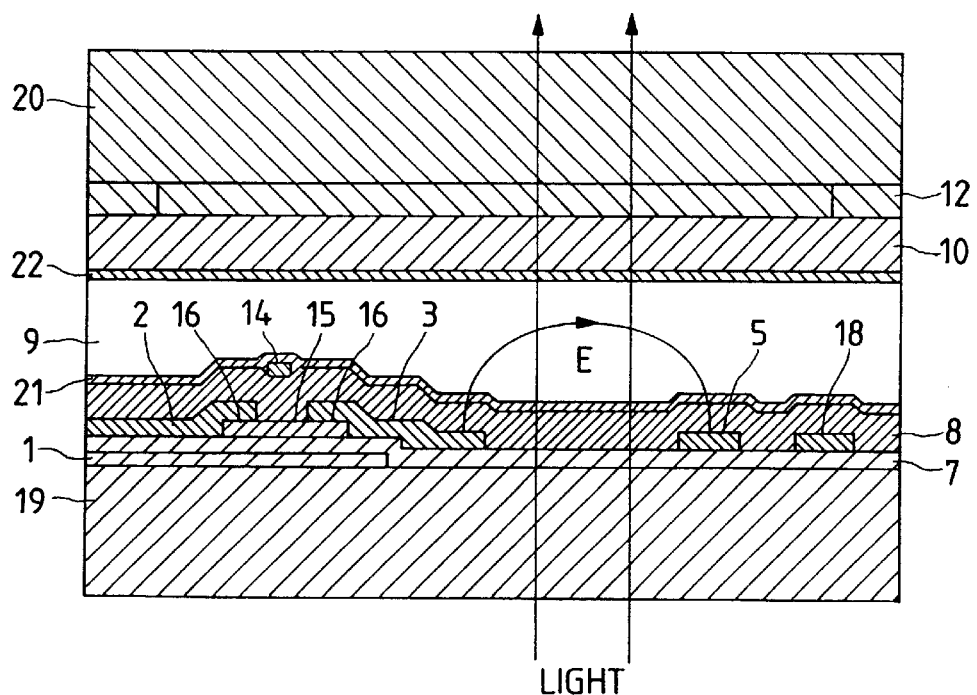

FIG. 13(a) is a schematic plan view of a pixel in a liquid crystal display panel of the embodiment, FIG. 13(b) is a schematic cross-sectional view being along the line H–H' in FIG. 13(a). The structural feature of the embodiment is in the point that the shield electrode 14 is formed on the protection film 8 in the TFT substrate 19. There is no conductive material on the opposite substrate 20. Therefore, even if any conductive foreign substance is entered during fabrication process, there is no possibility to cause the contact between 26 electrodes through the opposite substrate 20 and the failure rate thereby is suppressed to zero. Consequently, the margin for cleanness in processes for forming orientation film, rubbing, filling liquid crystal and so on can be widened, the fabrication process control can be simplified.

There is no need electrically to connect the opposite substrate 20 to the TFT substrate 19 for supplying voltage to the shield electrode 14.

As described above, in the embodiment, the same effect as Embodiment 1 can be attained, and further it is possible to improve the fabrication yield.

Although the embodiment has been described based on Embodiment 1, it is possible in Embodiments 2, 3, 4 and 5 to form the shield electrode on the TFT substrate 8 similar to this embodiment, the same effect can be attained.

Embodiment 8

The construction of the embodiment here is the same as Embodiment 4 except the following items.

Figure 14A:
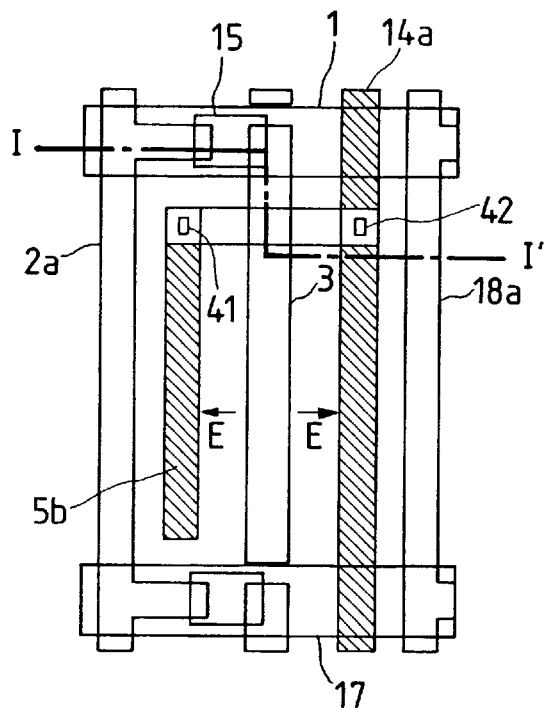
FIGS. 14(a) and 14(b) are views showing the structure of the pixel part in Embodiment 8.
Figure 14B:
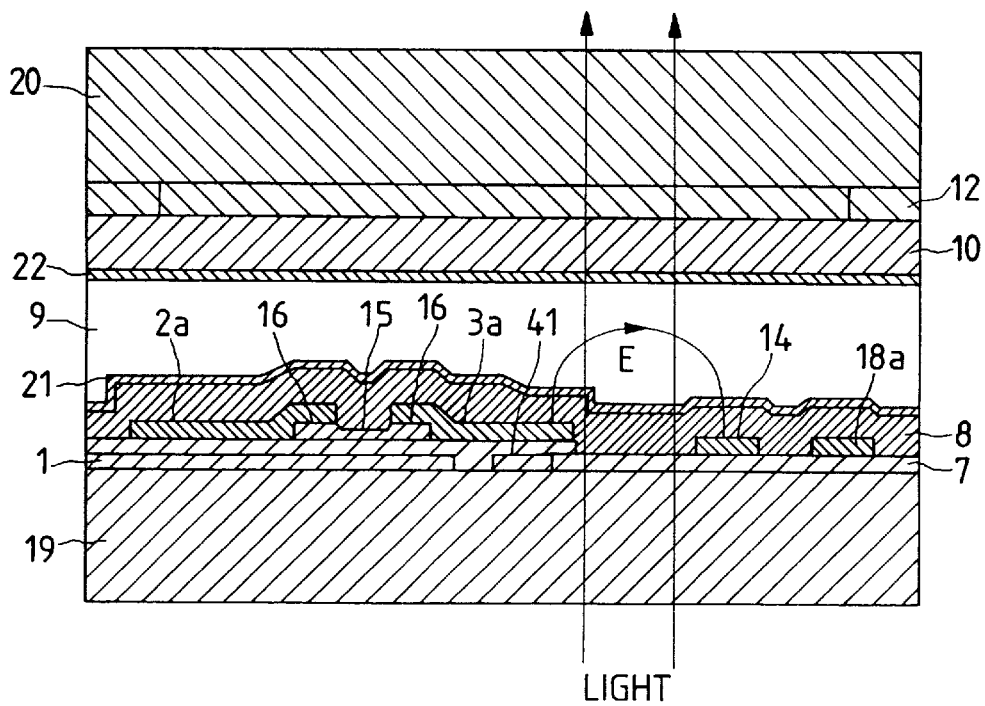

FIG. 14(a) is a schematic plan view of a pixel in a liquid crystal display panel of the embodiment, FIG. 14(b) is a schematic cross-sectional view being along the line I–I' FIG. 14(a). The structural feature of the embodiment is in the point that the shield electrodes 14a, 14b are formed of the same material, on the same layer and in the same process as the signal electrodes 2a, 18a are formed. The electrical connection between the common electrode 5b and the shield electrode 14b is performed by using a wire 41 which is formed of the same material, on the same layer and in the same process as the scanning electrodes 1, 17 are formed after making a through hole 42 on the gate insulating film 7.

Therewith, there is no need to add another process for making the shield electrode. Further, since there is no electrical conductive material on the opposite substrate 20 similar to Embodiment 7, there is no possibility to cause the contact between electrodes through the opposite substrate 20 and the failure rate thereby is suppressed to zero. Consequently, the margin for cleanness in processes for forming orientation film, rubbing, filling liquid crystal and so on can be widened, the fabrication process control can be simplified.

The strength of electric field varies depending on the distance between the pixel electrode 3 and the shield electrode 14a. A problem arises in that the deviation in the distance between the pixel electrode and the shield electrode causes the deviation in the brightness. Therefore, a high accuracy is required in alignment of the pixel electrodes and the common electrodes. In a method where two substrates having electrodes each are bonded together, the alignment accuracy is worse than the alignment accuracy for the photo-mask by two to three times. Since the shield electrodes 14a, 14b are formed of the same material, on the same layer and in the same process as the pixel electrodes 3 are formed, there is no problem in the above alignment accuracy.

As described above, in the embodiment, the same effect as Embodiment 4 can be attained, and further it is possible to obtain an active matrix liquid crystal display system being high in through-put and high in fabrication yield.

Although the embodiment has been described based on Embodiment 4, it is possible in Embodiments 1, 3 and 6 to form the shield electrodes of the same material, on the same layer and in the same process as the signal electrode is formed, and the same effect as in this embodiment can be attained.

Embodiment 9

The construction of the embodiment here is the same as Embodiment 4 except the following items.

Figure 15A:
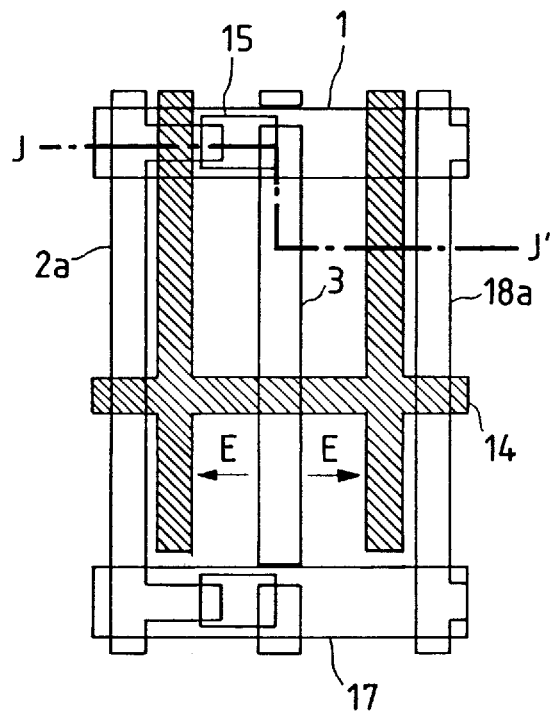
FIGS. 15(a) and 15(b) are views showing the structure of the pixel part in Embodiment 9.
Figure 15B:
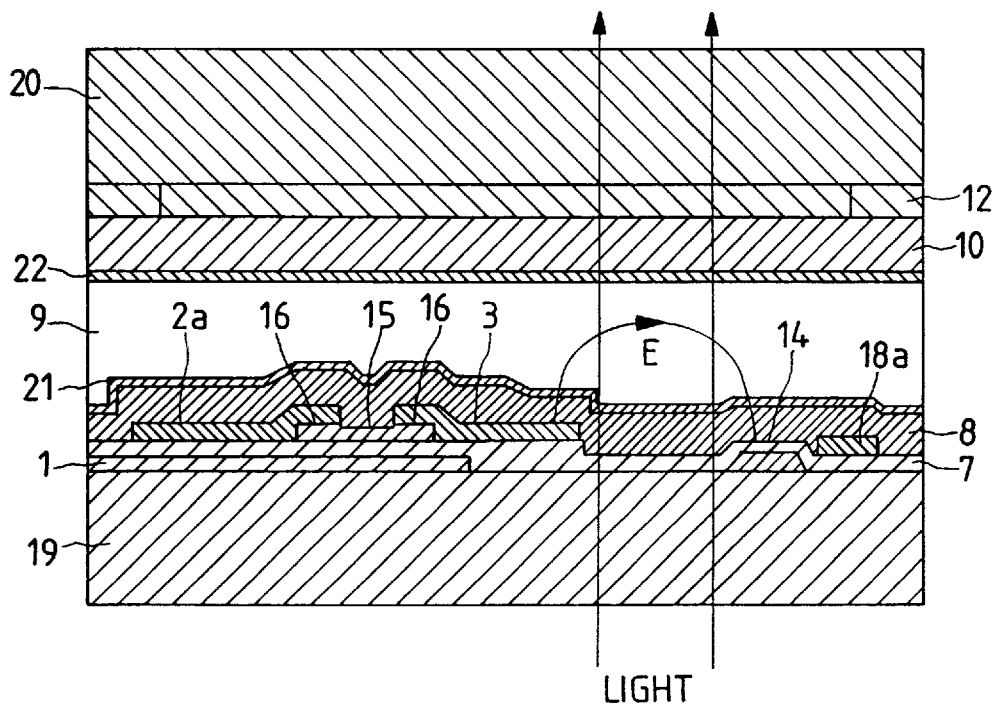

FIG. 15(a) is a schematic plan view of a pixel in a liquid crystal display panel of the embodiment, FIG. 15(b) is a schematic cross-sectional view being along the line J–J' in FIG. 15(a). The structural feature of the embodiment is in the point that the shield electrode 14 is formed of the same material, on the same layer and in the same process as the scanning electrodes 1, 17 are formed, and the electrode is extended in the horizontal direction to connect to a common line to which the common electrodes in the other rows are connected. The liquid crystal molecules are controlled by the electric field E between the pixel electrode 3, its longitudinal direction being in the vertical direction, and the projected portion projecting toward the vertical direction from the shield electrode 14. Therewith, there is no need to add another process for making the shield electrode 14.

Further, since there is no electrical conductive material on the opposite substrate 20 similar to Embodiment 2, there is no possibility to cause the contact between electrodes through the opposite substrate 20 and the failure rate thereby is suppressed to zero. Consequently, the margin for cleanness in processes for forming orientation film, rubbing, filling liquid crystal and so on can be widened, the fabrication process control can be simplified.

Furthermore, there is no need to provide any through hole like Embodiment 8, and consequently the connection failure between the common electrodes is eliminated. Since in the embodiment the pixel electrode 3 and the shield electrode 14 are formed on the identical substrate, the alignment accuracy between the pixel electrode 3 and the shield electrode 14 is high.

The projection projecting in the vertical direction from the shield electrode 14 may be overlaid on the signal electrodes 2a, 18a in the horizontal direction. Thereby, similar to Embodiment 5, the light leakage is not additionally caused without light shielding layer, and high contrast can be attained. Further, since the distance between the pixel electrode 3 and the projection of the shield electrode 14 becomes large, the area of light transmission portion (opening ratio) between the pixel electrode 3 and the projection of the shield electrode 14 is increased to improve the transmission ratio. Although connection of the shield electrode in this embodiment is made in such a manner as shown in FIG. 15, the connecting portion is not limited to that.

As described above, in the embodiment, the same effect as Embodiment 4 can be attained, and further it is possible to obtain an active matrix liquid crystal display system being high in through-put and high in fabrication yield.

Although the embodiment has been described based on Embodiment 4, it is possible in Embodiments 1, 2, 3, 5 and 6 to form the shield electrodes of the same material, on the same layer and in the same process as the scanning electrode is formed, and the same effect as in this embodiment can be attained.

Embodiment 10

The construction of the embodiment here is the same as Embodiment 1 except the following items.

Figure 16:
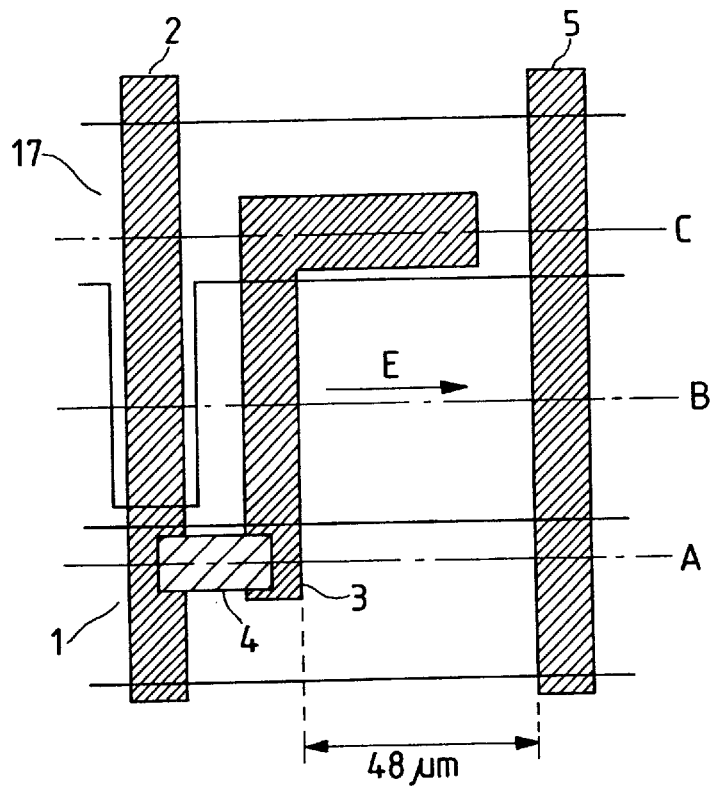
FIG. 16 is a schematic diagram showing the structure of the pixel part in Embodiment 10.
Figure 17:
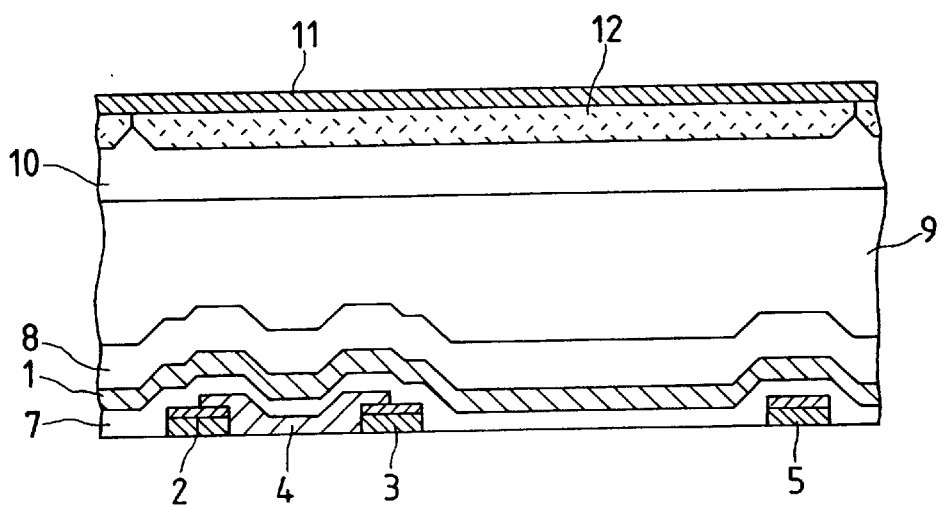
FIG. 17 is a view showing the cross-sectional structure on the plane of the line A in FIG. 16.

FIG. 16 shows the structure of a pixel. A scanning wire 1 (common with a gate electrode) and a signal wire 2 (common with a drain electrode) are intersected with each other at right angle, the pixel electrode 3 (common with the source electrode) and the common electrode 5 being parallel to each other, electric field being applied between the pixel electrode 3 and the common electrode 5, and the direction of the electric field is parallel to the interface of the substrate. FIG. 17 is a cross-sectional view being along the line A in FIG. 16. The thin film transistor has a positive stagger structure overlaying in order of the drain electrode 2 and the source electrode 3 in the lowermost layer, an amorphous silicon 4, a silicon nitride 7, the gate electrode.

Figure 18:
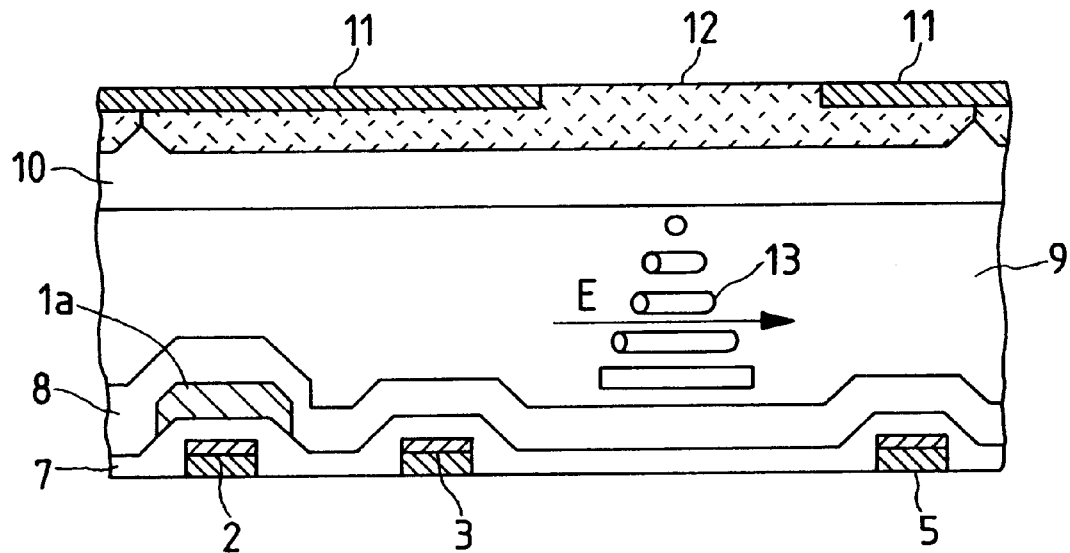
FIG. 18 is a view showing the cross-sectional structure on the plane of the line B in FIG. 16.
Figure 19:
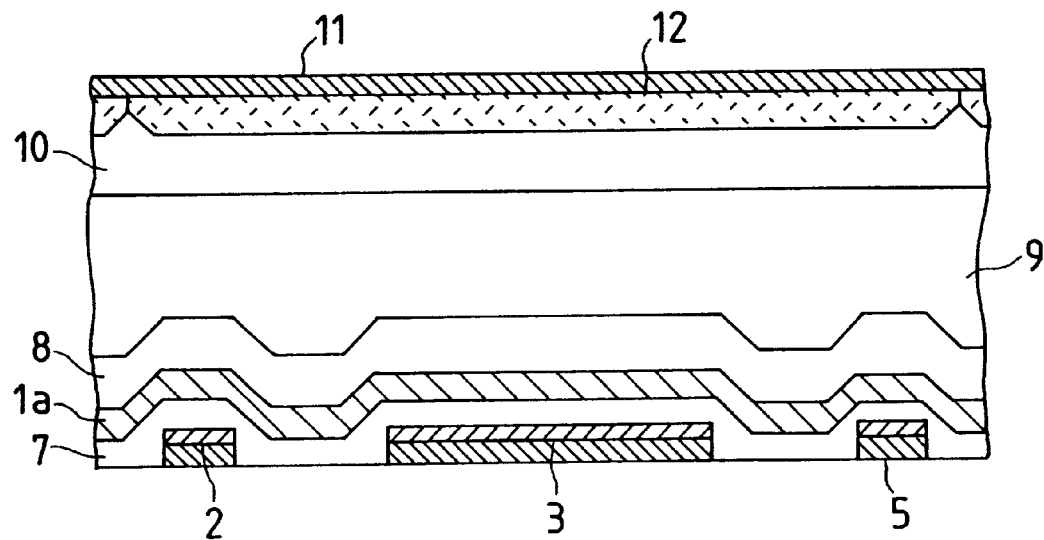
FIG. 19 is a view showing the cross-sectional structure on the plane of the line C in FIG. 16.

FIG. 18 is a cross-sectional view being along the line B in FIG. 16. Here, the signal wire 2 is covered with a projection projecting from the scanning wire 1a in the precedent stage toward the longitudinal direction of the signal wire to shield the electric field applied between the signal wire 2 and the pixel electrode 3. Since the electric potential in the scanning wire is constant except during scanning duration, the electric potential in the pixel electrode cannot be fluctuated. Therewith, the fluctuation in the electric potential in the pixel electrode 3 due to variation in the electric potential in the signal wire varied by the image signal is eliminated, and a stable display can be obtained. FIG. 19 is a cross-sectional view being along the line C in FIG. 16. In order to stabilize the electric potential in the pixel electrode 3, an accumulating capacitance is constructed with the pixel electrode 3, the scanning wire 17 in the precedent stage and the gate insulation film 7.

Effects

According to the present invention, since the pixel electrode is not necessary to be transparent and a commonly used metallic electrode can be used, it is possible to obtain an active matrix type liquid crystal display system which is high in fabrication yield and suitable for mass production.

Further, it is possible to obtain an active matrix type liquid crystal display system which is excellent in view angle characteristic and easy in multi-halftone display.

Especially, by means of forming the shield electrode, the parasitic capacitance between the signal electrode and the pixel electrode can be decreased and it is possible to obtain an active matrix type liquid crystal display system which is high in contrast and high in image quality without cross-talk. The compatibility of the above two effects can be attained. Furthermore, since the shield electrode serves also as a common electrode, the number of fabrication processes can be decreased.

What is claimed is:

1. A liquid crystal display device having a pair of substrates, a liquid crystal layer interposed between said pair of substrates, a plurality of scanning electrodes formed on one substrate of said pair of substrates, a plurality of signal electrodes formed so as to cross the plurality of scanning electrodes, a plurality of transistors each formed at a position corresponding to each of the crossing points of the scanning and signal electrodes, and a plurality of pixel electrodes each connected to each of the plurality of transistors, further comprising:

a plurality of common electrodes formed on one substrate of said pair of substrates for generating an electric field in said liquid crystal layer;

wherein said plurality of common electrodes include a connection extending in parallel with a direction of extension of said plurality scanning electrodes, and at least two portions extending substantially in parallel to one another being interconnected by the connection and extended from the connection in a direction of extension of said plurality of signal electrodes so as to orient to directions from the connection to two scanning electrodes on both sides of the connection; and wherein the connection of said plurality of common electrodes is formed in a central region between the two scanning electrodes.

2. A liquid crystal display device according to claim 1, wherein the at least two portions extended from the connection in a direction of extension of said plurality of signal electrodes are formed in a region interposed between the signal electrodes and the scanning electrodes.

3. A liquid crystal display device having a pair of substrates, a liquid crystal layer interposed between said pair of substrates, a plurality of scanning electrodes formed on one substrate of said pair of substrates, a plurality of signal electrodes formed so as to cross the plurality of scanning electrodes, a plurality of transistors each formed at a position corresponding to each of the crossing points of the scanning and signal electrodes, and a plurality of pixel electrodes each connected to each of the plurality of transistors, further comprising:

a plurality of common electrodes formed on one substrate of said pair of substrates for generating an electric field in said liquid crystal layer;

wherein said plurality of common electrodes include a connection portion extending in parallel with a direction of extension of said plurality of scanning electrodes and between two adjacent scanning electrodes, and at least two other portions extending substantially in parallel to one another being interconnected by said connection portion and extended from said connection portion in a direction of extension of said plurality of signal electrodes toward the two adjacent scanning electrodes; and wherein said connection portion of the plurality of common electrodes is formed in a central region between the two adjacent scanning electrodes.

4. A liquid crystal display device according to claim 3, wherein said at least two other portions extended in a direction of extension of said plurality of signal electrodes are formed in a region interposed between the signal electrode and the pixel electrode.

* * * * *